US009460159B1

(12) United States Patent
Mostowy et al.

(10) Patent No.: US 9,460,159 B1
(45) Date of Patent: Oct. 4, 2016

(54) DETECTING VISIBILITY OF A CONTENT ITEM USING TASKS TRIGGERED BY A TIMER

(71) Applicant: Google Inc., Mountain View, CA (US)

(72) Inventors: Walter Alexander Mostowy, Pasadena, CA (US); Rudiger Lippert, Los Angeles, CA (US); Peng Zhang, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 246 days.

(21) Appl. No.: 14/101,620

(22) Filed: Dec. 10, 2013

Related U.S. Application Data

(60) Provisional application No. 61/866,019, filed on Aug. 14, 2013.

(51) Int. Cl.
  *G06F 7/00* (2006.01)
  *G06F 17/30* (2006.01)

(52) U.S. Cl.
  CPC ..... *G06F 17/3053* (2013.01); *G06F 17/30528* (2013.01); *G06F 17/30557* (2013.01)

(58) Field of Classification Search
  CPC .......... G06F 17/30528; G06F 17/30554; G06F 17/30557; G06F 17/3056; G06F 17/30563
  USPC ............... 707/725, 726, 736, 741; 709/224
  See application file for complete search history.

(56) References Cited

U.S. PATENT DOCUMENTS

| | | | | |
|---|---|---|---|---|
| 5,283,786 A * | 2/1994 | Hoff | .............. | H04Q 11/04 370/363 |
| 5,287,488 A * | 2/1994 | Sakata | .............. | G06F 8/71 703/22 |
| 5,493,648 A * | 2/1996 | Murray | .............. | G06F 3/14 345/537 |
| 5,924,072 A * | 7/1999 | Havens | .............. | G06Q 10/063 705/7.11 |
| 7,035,911 B2 * | 4/2006 | Lowery | .............. | G06F 17/30902 707/999.002 |
| 7,047,411 B1 * | 5/2006 | DeMello | .............. | G06F 21/10 713/164 |
| 7,203,966 B2 * | 4/2007 | Abburi | .............. | G06F 21/10 380/201 |
| 7,330,717 B2 * | 2/2008 | Gidron | .............. | G06Q 30/04 455/405 |
| 7,346,413 B2 * | 3/2008 | Bortnick | .............. | G06Q 10/10 700/104 |
| 7,370,016 B1 * | 5/2008 | Hunter | .............. | G06Q 20/102 705/40 |
| 7,409,635 B2 * | 8/2008 | Epstein | .............. | G06F 17/217 715/243 |
| 7,551,888 B2 * | 6/2009 | Kopra | .............. | H04H 20/18 455/3.05 |
| 7,624,149 B2 * | 11/2009 | Sheppard | .............. | H04L 51/04 709/206 |
| 7,685,078 B2 * | 3/2010 | Chen | .............. | G06F 17/30864 706/12 |
| 7,711,578 B2 * | 5/2010 | Williams | .............. | G06Q 10/10 705/2 |

(Continued)

OTHER PUBLICATIONS

Mostowy, Walter, Cross-Domain iFrame Ad Visibility Measurements in Firefox: Design Doc, Mar. 12, 2013 (3 pgs.).

(Continued)

*Primary Examiner* — Daniel Kuddus
(74) *Attorney, Agent, or Firm* — Foley & Lardner LLP; John D. Lanza

(57) ABSTRACT

A module may be included with a content item. The module may be configured such that the module performs a number of tasks at a first rate via a timer when the module is visible and at a second rate via a timer when the module is not visible. A script may be used with the module to determine the number of times the task has been executed by the module and to compare the number of times the task has been executed to a value. If the number of times that the task has been executed by the module is greater than the value then data may be output to indicate the that content item has been viewed. In some instances, the module may be used with a content item served in a cross-domain iframe.

20 Claims, 9 Drawing Sheets

(56) References Cited

U.S. PATENT DOCUMENTS

| | | | |
|---|---|---|---|
| 7,716,326 B2 | 5/2010 | Blumenau | |
| 7,720,721 B1* | 5/2010 | Goldstein | G06Q 30/0601 705/26.1 |
| 7,970,649 B2* | 6/2011 | Wu | G06Q 30/02 705/14.53 |
| 8,239,491 B1* | 8/2012 | Tsun | G06F 17/30902 705/14.67 |
| 8,433,750 B1* | 4/2013 | Carlson | G06F 11/3419 709/203 |
| 2009/0171790 A1* | 7/2009 | Nagarajayya | G06Q 30/02 705/14.61 |
| 2012/0016749 A1* | 1/2012 | Lisbakken | G06Q 30/0275 705/14.71 |
| 2012/0324098 A1* | 12/2012 | De Jager | G06Q 30/02 709/224 |

OTHER PUBLICATIONS

Mostowy, Walter, Cross-domain iFrame Ad Visibility Measurements Using Flash: Design Doc, May 14, 2013 (8 pgs.).

Mostowy, Walter, Pixel Visibility Experiment Design Doc, May 18, 2013 (5 pgs.).

Flash Player Stops Animating When Out of Viewport, http://stackoverflow.com/questions/13701121/flash-player-stops-animating-when-out-of-viewport, 3 pages, accessed Dec. 9, 2013.

Minimizing CPU usage, Adobe Product Support, http://help.adobe.com/en_US/as3/mobile/WS4bebcd66a74275c36cfb8137124318eebc6-8000.html#WS4a4606c864353c0a-dcb49ee124a2e6df51-8000, 12 pages, accessed Dec. 9, 2013.

Uro, Tinic, Frame rates in the Flash Player, Kaourantin.net, May 7, 2006, 12 pages, http://www.kaourantin.net/2006/05/frame-rates-in-flash-player.html.

Uro, Tinic, On Performance, Kaourantin.net, Sep. 3, 2008, 10 pages, http://www.kaourantin.net/2008/09/on-performance.html.

Uro, Tinic, Timing it Right, Kaourantin.net, Mar. 1, 2010, 11 pages, http://www.kaourantin.net/2010/03/timing-it-right.html.

How Flash Player 10.1 "Broke" My Banner (and How I Fixed It), http://www.scriptocalypse.com/?p=56, 7 pages, accessed Dec. 9, 2013.

Sutherland, Ivan Edward, Sketchpad: A Man-Machine Graphical Communication System, Technical Report, No. 574, University of Cambridge, Sep. 2003, 149 pages, http://www.cl.cam.ac.uk/techreports/UCAM-CL-TR-574.pdf.

Foley, James et al., Computer Graphics: Principles and Practice, 1990, p. 1174.

\* cited by examiner

DETECTING VISIBILITY OF A CONTENT ITEM USING TASKS TRIGGERED BY A TIMER

CROSS-REFERENCE TO RELATED PATENT APPLICATIONS

This application claims priority to U.S. Provisional Patent Application Ser. No. 61/866,019, filed Aug. 14, 2013, and entitled "Detecting Visibility of a Content Item Using Tasks Triggered By a Timer," the disclosure of which is hereby incorporated by reference.

BACKGROUND

In a networked environment, such as the Internet or other networks, first-party content providers can provide information for public presentation on resources, for example web pages, documents, applications, and/or other resources. The first-party content can include text, video, and/or audio information provided by the first-party content providers via, for example, a resource server for presentation on a client device over the Internet. Additional third-party content can also be provided by third-party content providers for presentation on the client device together with the first-party content provided by the first-party content providers. Thus, a person viewing a resource can access the first-party content that is the subject of the resource, as well as the third-party content that may or may not be related to the subject matter of the resource.

SUMMARY

Implementations described herein relate to using a module configured to execute tasks at a first rate when not displayed and at a second rate when displayed. The module may be used with a served content item to detect when the content item is displayed on a display of a client device. Such detection may be useful when the content item is served in a cross-domain iframe.

One implementation relates to a method for detecting visibility of a content item. The method includes receiving a request for a content item and selecting code to configure a module. The module may be configured to execute a task a first predetermined number of times per second when the module is visible on a display of a client device and a second predetermined number of times per second when the module is not visible on the display of the client device. The method may further include generating a script. The script may be configured to determine that the content item is to be displayed as part of a cross-domain iframe and associate the module with the content item. The script may be further configured to retrieve a number of times the task executed by the module has been performed, compare the retrieved number of times to a value, and output data to a view data module of the content item selection system. The data may include a parameter indicating the content item was viewed if the number of times the task executed by the module has been performed is greater than the value. The method may further include serving the content item, the script, and the selected code to the client device.

Another implementation relates to a method for outputting a view parameter for a content item. The method may include receiving a content item and code to configure a module associated with the content item. The module may be configured to execute a task a first predetermined number of times per second when the module is visible on a display of the client device and a second predetermined number of times per second when the module is not visible on the display of the client device. The method further includes determining a first number of times the task executed by the module has been performed and storing the first number of times in a cache. The method includes determining a second number of times the task executed by the module has been performed after a time period has elapsed and comparing the first number of times stored in the cache to the second number of times. The method still further includes transmitting data to a content item selection system including a parameter indicating the content item was viewed if the comparing of the first number of times to the second number of times results in a difference that is greater than a predetermined value. The predetermined value may be a numerical value between the first predetermined number of times and the second predetermined number of times.

Yet a further implementation relates to a system having one or more processors and a storage device. The storage device includes instructions that cause the one or more processors to perform several operations. The operations include receiving a request for a content item and selecting code to configure a first module. The first module is configured to execute a task a first predetermined number of times per second when the first module is visible on a display of a client device and a second predetermined number of times per second when the first module is not visible on the display of the client device. The operations further include generating a script. The script may be configured to determine that the content item is to be displayed as part of a cross-domain iframe and to associate the first module with the content item. The first module may be an invisible pixel-sized module, and the first module may be associated with a first pixel of the content item positioned substantially at a center of the content item. The script may be further configured to determine a first number of times the task executed by the first module has been performed and to determine a second number of times the task executed by first module has been performed after a time period has elapsed. The script may still further be configured to compare the determined first number of times to the determined second number of times and to output data including a parameter. The parameter indicates that the content item was viewed if the comparison of the determined first number of times to the determined second number of times results in a difference that is greater than a predetermined value, and the parameter indicates that the content item was not viewed if the difference is not greater than the predetermined value. The operations further include serving the content item, the script, and the selected code to the client device in response to the request for a content item.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
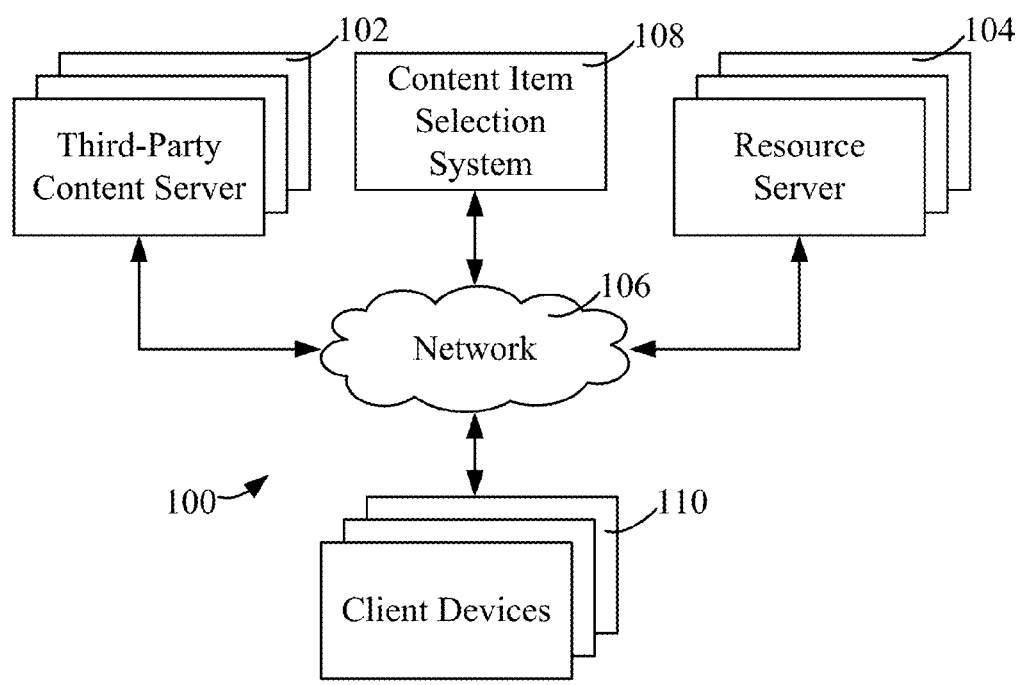
FIG. 1 is a block diagram depicting an implementation of a system for providing information via a network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A computing device (e.g., a client device) can view a resource, such as a web page, via the Internet by communicating with a server, such as a web page server, corresponding to that resource. The resource includes first-party content that is the subject of the resource from a first-party content provider, as well as additional third-party provided content, such as advertisements or other content. In one implementation, responsive to receiving a request to access a web page, a web page server and/or a client device can communicate with a data processing system, such as a content item selection system, to request a content item to be presented with the requested web page. The content item selection system can select a third-party content item and provide data to effect presentation of the content item with the requested web page on a display of the client device. In some instances, the content item is selected and served with a resource associated with a search query response. For example, a search engine may return search results on a search results web page and may include third-party content items related to the search query in one or more content item slots of the search results web page.

In some instances, a device identifier is associated with the client device. The device identifier may include a randomized number associated with the client device to identify the device during subsequent requests for resources and/or content items. In some instances, the device identifier is configured to store and/or cause the client device to transmit information related to the client device to the content item selection system and/or resource server (e.g., a web browser type, an operating system, prior resource requests, prior content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for display with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other implementations, a third-party content provider may place a bid in the auction that corresponds to an agreement to pay a certain amount of money if the content item is selected and served (e.g., the provider agrees to pay $0.005 each time a content item is selected and served). In some instances, the content item selection system uses content item interaction data to determine the performance of the third-party content provider's content items. For example, users may be more inclined to click on third-party content items on certain web pages over others. Accordingly, auction bids to place the third-party content items may be higher for high-performing web pages, categories of web pages, and/or other criteria, while the bids may be lower for low-performing web pages, categories of web pages, and/or other criteria.

In some instances, a web page or other resource (such as, for example, an application) includes one or more content item slots in which a selected and served third-party content item may be displayed. The code (e.g., JavaScript®, HTML, etc.) defining a content item slot for a web page or other resource may include instructions to request a third-party content item from the content item selection system to be displayed with the web page.

In such instances, it may be useful to determine when the third-party content item is viewed. For example, such a determination may increase marketplace efficiency because third-party content providers may consider unviewed third-party content items as wasteful and potentially dilutes the value of an impression of a content item. In addition, for some third-party content providers, such as "brand" content providers, the value of a viewed content item may be greater, resulting in a willingness of the third-party content provider to pay more for viewed content items.

In some implementations, direct measurements of the third-party content item relative to the web page may be usable to determine whether the third-party content item is viewed. For example, a size of a web browser's "viewport," a size of the third-party content item and/or content item slot, and a location of the third-party content item and/or content item slot relative to the viewport may be used to determine whether the third-party content item is viewable.

The content item slots may be cross-domain iframes in some implementations. In such instances, it may be difficult to detect whether the third-party content item within the cross-domain iframe is viewable via code executing with the third-party content item in the cross-domain iframe. This may result due to web browser security constraints that prevent access from the cross-domain iframe to the size and location of the cross-domain iframe relative to the web page displaying the cross-domain iframe. In such situations, it may be useful to provide an alternative to detect whether a third-party content item presented in the cross-domain iframe is viewable.

In one implementation, a module, such as an Adobe® Flash® module, may be used with the third-party content item displayed in the cross-domain iframe. The module can be configured to indicate the visibility of the module. Accordingly, one or more pixel-sized modules can, when presented with the third-party content item, be used to determine the visibility of third-party content item. In some implementations, as will be described in greater detail herein, several modules may be presented with the third-party content item at one or more locations relative to the third-party content item.

In one implementation, the module may be an Adobe® Flash® module. Adobe® Flash® is a browser plugin that may be installed on a large number of client devices. Adobe® Flash® is designed to facilitate rich features across browsers, widely used to view videos and play games, among other things. As with many graphical features, Adobe® Flash® has features in place to limit computational resource consumption. Such features may be leveraged to measure viewability. For example, Flash® animations may throttle the frame rate of the animation when the Flash® module is out of view. This throttling may also be applied to tasks executed by the Flash® module. Such throttling may be used to measure viewability as a result. As will be described in greater detail below, such throttling may be detected using the Timer feature of Flash®. That is, when the Flash® module is off screen, Timer events are limited to 2 per second, even if the module is within a cross-domain iframe. Therefore, counting the number of times the Timer fires to execute a task indirectly measures when the module is on or off screen.

Accordingly, in one implementation the Adobe® Flash® module may be configured to asynchronously schedule a task to run. Such an asynchronous scheduling of a task may be configured using a timer feature of Adobe® Flash®, such as flash.utils.Timer. The timer may be configured to execute the task at predetermined intervals using a delay value. Once the elapsed time exceeds the delay value, the task is executed. In some implementations, the timer may be configured to execute the task a predetermined number of times per second, such as 24 times per second. When the Flash® module is visible, the timer causes the task to be executed at the predetermined number of times per second. However, when the Flash® module is not visible, the timer is throttled to a second predetermined number of times per second, such as 2 times per second. The number of times a task has been executed by the timer may be determined by getting the current count of the timer, such as by using currentCount( ). Accordingly, if the Flash® module is presented with a selected third-party content item, such as an invisible pixel-sized Flash® module located substantially at the center of the third-party content item, the number of times the task is executed by Flash® module, such as that measured by the current count of the timer, may be an indirect manner to measure whether the third-party content item presented in the cross-domain iframe is viewable.

In some implementations, a script may be included with the selected third-party content item and the Flash® module. The script may be configured to send data to a content item selection system and/or another system indicative of whether the third-party content item was viewed or not (e.g., displayed in a viewable region of a display of a client device). In some implementations, the script may be configured to call a function to check the current count of the timer to determine how many tasks have been executed by the Flash® module. In some implementations, the function may determine a number for the current count of the timer at a rate, such as once per second, to determine the number of times the task has been executed by the Flash® module has been performed. The function may store a first number of times the task executed by the Flash® module has been performed in a cache. The function may then determine a second number of times the task executed by the Flash® module has been performed after the time period for the rate has elapsed, such as after one second has elapsed. The second number of times may be compared to the first number of times to determine a difference value. If the difference value is greater than a threshold value, such as 10, then the script may be configured to output or transmit data to the view data module that includes a parameter indicating the third-party content item was viewed. If the difference value is not greater than the threshold value and a page session ends, then the script may be configured to output or transmit data to the view data module that includes a parameter indicating the third-party content item was not viewed. In some implementations, two consecutive difference values must be greater than the threshold value for the script to output or transmit data to the view data module that includes a parameter indicating the third-party content item was viewed.

When the pixel-sized Flash® module is positioned substantially in a center of a third-party content item, then it may be assumed that approximately 50% of the third-party content item is visible when the Flash® module is visible and that less than 50% of the third-party content item is visible when the Flash® module is not visible. Under some standards of measurement, when 50% of a third-party content item is visible for at least one second, then the third-party content item may be counted as viewed. Thus, the script may be configured to poll the Flash® module to determine whether approximately 50% of the third-party content item has been visible for at least one second. When the script determines that the third-party content item is 50% visible at one point in time, and is also 50% visible one second later, then the third-party content item is "viewed" and the script is configured to output data including a parameter indicating that the third-party content item was viewed. If third-party content item does not meet such a criteria and a page session ends, then the script is configured to output data including parameter indicating the third-party content item was not viewed. In some implementations, the script may be further configured to output data including parameter indicating that viewing of the third-party content item was unmeasurable, such as if the number of tasks performed is zero for a period of time. In some implementations, the pixel-sized module positioned substantially in the center of a third-party content item may result in a precision of 0.89 and a recall of 0.96.

In one implementation, the detection of whether a third-party content item is visible may be performed by injecting pixel-sized Flash® modules into a third-party content item, reading, using a script, each module's Timer event-fire count periodically (e.g., every 100 ms), calculating a difference value for the current count with a previous count for the module, and using the difference value to determine whether the module is visible or not visible.

While the foregoing has provided an overview of detecting the visibility of a third-party content item presented in a cross-domain iframe using tasks triggered by a timer of a Flash® module, more specific implementations and systems to implement such a system will now be described.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 108. The content item selection system 108 can include at least one logic device, such as a computing device having a data processor, to communicate via the network 106, for example with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect presentation of one or more content items to the resource server 104 and/or the client device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide web page data and/or other data to the client device 110, which causes visual indicia to be displayed by the display of the client device 110. Accordingly, the browser window displays the retrieved first-party content, such as web pages from various websites, to facilitate user interaction with the first party content.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for example, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a web page. The client device 110 may be a computing device operated by a user (represented by a device identifier), which, when accessing a resource of the resource server 104, can make a request to the content item selection system 108 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, whether the client device has cached code to configure or generate a Flash® module, whether the client device has Flash® installed, the version of Flash® installed, etc.) and resource information (e.g., URL of the requested resource, one or more keywords of the content of the requested resource, text of the content of the resource, a title of the resource, a category of the resource, a type of the resource, whether the third-party content item will be displayed in a cross-domain iframe, etc.). The information that the content item selection system 108 receives can include a HyperText Transfer Protocol (HTTP) cookie which contains a device identifier (e.g., a random number) that represents the client device 110. In some implementations, the device information and/or the resource information may be appended to a content item request URL (e.g., //contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 108 to select third-party content items to be served with the requested resource and presented on a display of a client device 110.

In some instances, a resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 110. The search results may include web page titles, hyperlinks, etc. One or more third-party content items may also be presented with the search results in a content item slot, including a cross-domain iframe, of the search result web page. Accordingly, the resource server 104 and/or the client device 110 may request one or more content items from the content item selection system 108 to be presented in the content item slot of the search result web page. The content item request may include additional information, such as the user device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For example, the third-party content provider may set bid values and/or selection criteria via a user interface that may include one or more content item conditions or constraints regarding the serving of content items. A third-party content provider may specify that a content item and/or a set of content items should be selected and served for user devices 110 having device identifiers associated with a certain geographic location or region, a certain language, a certain operating system, a certain web browser, etc. In another implementation, the third-party content provider may specify that a content item or set of content items should be selected and served when the resource, such as a web page, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

Figure 2:
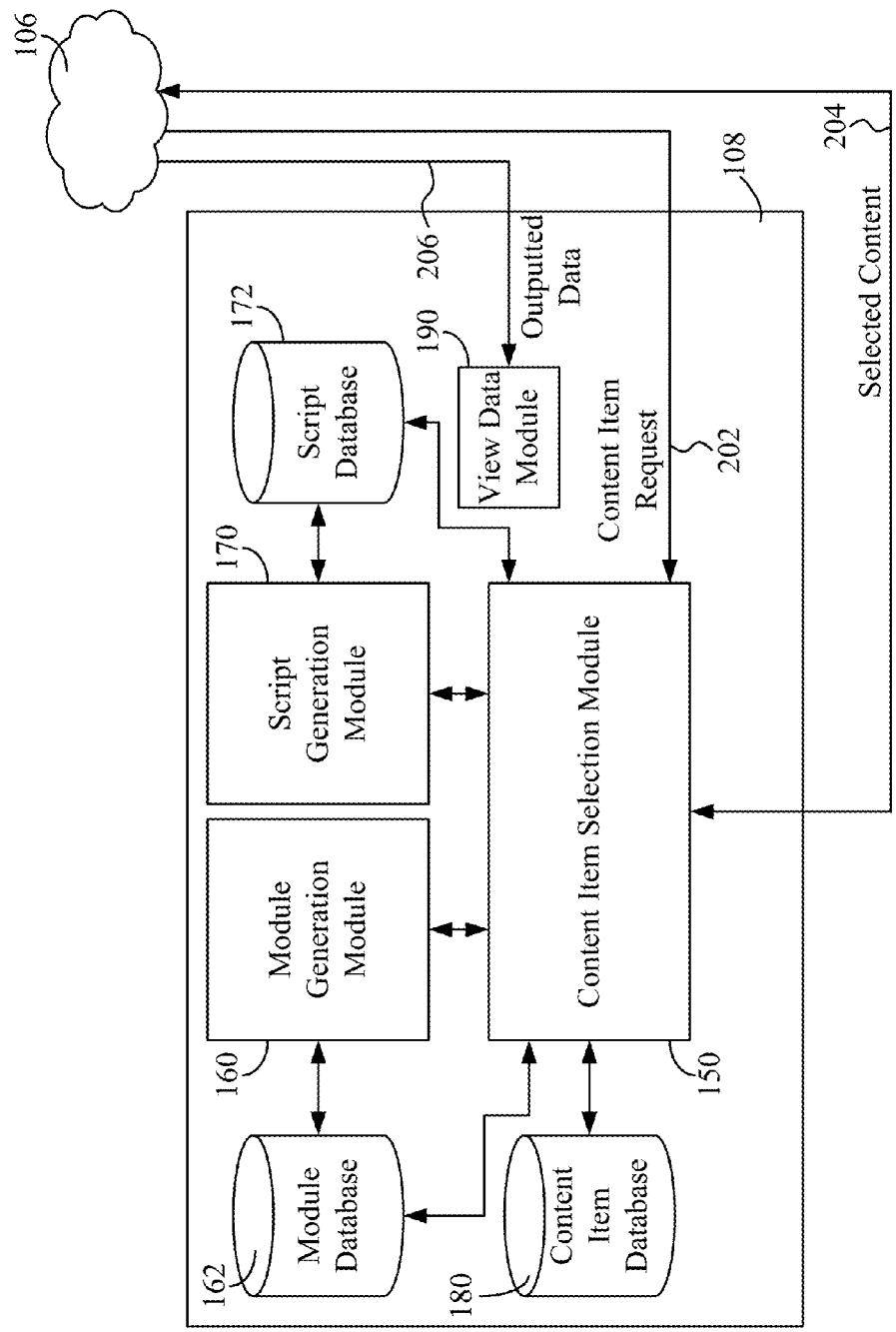
FIG. 2 is a block diagram depicting an implementation of a content item selection system.

Referring now to FIG. 2, portions of the content item selection system 108 are shown in more detail. In the present implementation, the content item selection system 108 includes a content item selection module 150, a module generation module 160, a script generation module 170, a content item database 180, and a view data module 190. In some implementations, a module database 162 and/or a script database 172 may be used to store modules and scripts generated by the module generation module 160 and/or the script generation module 170, respectively. Such databases 162, 172 may be accessible by the content item selection module 150 or another module of the content item selection system 108 to retrieve previously generated modules and/or scripts.

The content item selection module 150 is configured to receive a content item request 202 via the network 106. A client device, such as the client device 110 of FIG. 1, or a resource server, such as resource server 104, may send the content item request 202 to the content item selection system 108 via the network 106. The content item selection module 150 is configured to perform an auction to select a third-party content item, such as a third-party content item stored in the content item database 180, and to transmit data to effect display of the selected third-party content item 204 in response to the content item request 202. As will be discussed in greater detail below, the data transmitted in response to the content item request 202 may also include code to configure a module, such as a Flash® module, to be associated with the selected third-party content item and a script associated with the selected third-party content item and the module such that the script may monitor the module and output data 206 to the view data module 190 of the content item selection system 108. The view data module 190 receives the outputted data 206 and may store the outputted data 206 in a database (not shown) and/or may process the outputted data 206, such as for billing purposes. In some implementations, the view data module 190 may be included in or an entirely separate system from the content item selection system 108.

In some implementations, the content item selection module 150 includes or associates code, such as a .SWF file, to configure a module, such as a Flash® module, from the module generation module 160, such as a Flash® module generation module, and a script generated by the script generation module 170 with the selected third-party content item. The content item selection module 150 may utilize the content item request URL to determine whether a client device sending the content item request 202 has cached code to configure the Flash® module, in some implementations. In other implementations, the script generated by the script generation module 170 may be configured to determine whether the client device has cached code to configure the Flash® module. If the client device does have cached code to configure the Flash® module, the script may include data indicating where one or more copies of the Flash® module should be positioned relative to the selected and served third-party content item (e.g., data indicating that a single Flash® module should be positioned substantially at the center of the third-party content item, data indicating that several Flash® modules should be positioned at several positions of the third-party content item, etc.).

If the client device sending the content item request 202 does not include cached code to configure a Flash® module (e.g., the content item request URL does not include data indicative of the client device having cached code to configure the Flash® module or the script determines that the client device does not have cached code to configure the Flash® module), then the module generation module 160 is configured to send code to generate or configure a Flash® module to be presented with the selected third-party content item. In one implementation, the code to generate or configure the Flash® module may simply include sending a copy of the code for the Flash® module, such as a .SWF file, stored in the module database 162. The modules described herein are configured to asynchronously schedule a task to run. In one implementation, such an asynchronous scheduling of a task may be configured using a timer feature of Adobe® Flash®, such as flash.utils.Timer, for versions of Flash® from 10.1, inclusive, to version 11. The timer is configured to execute the task at predetermined intervals using a delay value. Once the elapsed time exceeds the delay value, the task is executed. In some implementations, the timer may be configured to execute the task a predetermined number of times per second, such as approximately 24 times per second. The delay value may be set to a value such as 41.667 milliseconds or 42 milliseconds. Of course, other predetermined numbers of times per second and/or delay values may be used. For example, the predetermined number of times per second may be 10 times per second, 30 times per second, 50 times per second, 100 times per second, etc. In one implementation, the timer feature of the Flash® module may be set by:

var detectTimer:Timer=new Timer(42, 0);

where 42 is the delay value of 42 milliseconds and 0 is the repeat count value such that the timer repeats indefinitely. The code from the module generation module 160 may also configure the size the Flash® module to the size of a single pixel.

The script generation module 170 is configured to generate a script that is associated with the selected third-party content item and the Flash® module. For example, the script may be a JavaScript® script that can be embedded in the data to effect presentation of the selected content item or the script may simply be associated with the selected content item and sent with the data to effect presentation of the selected content item. The script is configured to output data 206, such as an image request, to be sent to the view data module 190 with a parameter indicative of whether the served third-party content item was viewed on a display of a device, such as the client device 110. The outputted data 206 may include only the parameter indicating that the served content item was viewed on a display of a device or the outputted data 206 may also include other parameters, such as a length of time that the third-party content item was displayed, characteristics of the client device, interactions with the third-party content item, etc. In some instances, the outputted data 206 may be associated with a unique identifier, such as that for the content item request 202. In some implementations, the script may output the data immediately after it is determined that the third-party content item was viewed or the script may output the data at the end of a page session.

The script generated by the script generation module 170 includes a function to check the current count of the timer to determine how many tasks have been executed by a module associated with the third-party content item. In some implementations, the script is configured to loop through the function to determine a number for the current count of the timer at a rate, such as once per second, to determine the number of times the task has been executed by the module has been performed. Of course other rates may be used, such as twice per second, four times per second, once every two seconds, etc. The function may also store a first number of times the task executed by the module has been performed in a cache. The function may then determine a second number of times the task executed by the module has been performed after the time period for the rate has elapsed, such as after one second has elapsed. The function may be further configured to compare the second number of times to the first number of times to determine a difference value. If the difference value is greater than a threshold value, such as 10, then the script may be configured to output or transmit data to the view data module 190 that includes a parameter indicating the third-party content item was viewed. If the difference value is not greater than the threshold value and a page session ends, then the script may be configured to output or transmit data to the view data module 190 that includes a parameter indicating the third-party content item was not viewed.

In some implementations, the script may be configured to output or transmit data to the view data module 190 that includes a parameter indicating the third-party content item was viewed only if two consecutive difference values are greater than the threshold value. Thus, the function may determine a first number of times the task has been executed by the module has been performed. The function may store the first number of times the task executed by the module has been performed in a cache. The function then determines a second number of times the task executed by the module has been performed after the time period for the rate has elapsed, such as after one second has elapsed. The function is configured to compare the second number of times to the first number of times to determine a first difference value. If the first difference value is greater than the threshold value, then a counter may be incremented to a value, such as 1. The function may store the second number of times the task executed by the module has been performed in the cache. In some implementations, the storing of the second number of times in the cache may overwrite the first number of times, thereby reducing the size of the cache. In other implementations, the second number of times may be appended to or otherwise stored in the cache such that the first number of times remains in the cache. Thus, the function may generate a log using the number of times. In some implementations, the first number of times may be associated with a first time value (e.g., a timestamp) and the second number of times may be associated with a second time value.

The function then determines a third number of times the task executed by the module has been performed after another time period for the rate has elapsed, such as after another second has elapsed. The function is configured to compare the third number of times to the second number of times to determine a second difference value. If the second difference value is greater than the threshold value and the counter has a value of 1, then the script outputs or transmits data to the view data module 190 that includes a parameter indicating the third-party content item was viewed. If the second difference value is not greater than the threshold value, then the script resets the counter to 0 and continues to poll the number of times the task has been executed by the module has been performed. The function may store the third number of times the task executed by the module has been performed in the cache in a similar manner to the second number of times described above. In some implementations, the counter may be omitted and the function simply perform a sub-function to check that the second difference is also greater than the threshold value.

In some implementations, if the function of the script determines that the difference between the number of times the task executed by the module has been performed is zero over a few seconds, the script may be configured to output or transmit data to the view data module 190 that includes a parameter indicating that the third-party content item was "unmeasurable." For example, the module may be frozen.

In some implementations, the module may be deactivated once the script outputs the data that includes a parameter indicating the third-party content item was viewed. In other implementations, the module may continue to run even after the data is output by the script. For example, a module, such as a Flash® module, may continue to run and the number of times that the task executed by the Flash® module has been performed may be logged in the cache or a log.

In some implementations, such as where the version of Flash® installed on a client device is version 11, inclusive, or greater, then the Flash® module generation module 160 may instead be configured to use a ThrottleEvent event object. The ThrottleEvent object switches ThrottleType states when the Flash® module becomes invisible or visible. The ThrottleEvent object may include a ThrottleType such as ThrottleEvent.state=ThrottleType.Throttle, indicating the Flash® module is not visible, ThrottleEvent.state=ThrottleType.Pause, indicating that the Flash® module is paused, and/or ThrottleEvent.state=ThrottleType.Resume, indicating that the Flash® module is visible. In some implementations, the ThrottleEvent may be configured to output a signal to the script in response to the ThrottleEvent.state=ThrottleType.Resume. The script may be configured to receive the signal and output or transmit data to the view data module 190 that includes a parameter indicating the third-party content item was viewed in response to receiving the signal from the script. In other implementations, the script may poll the ThrottleEvent state one second after receiving the signal to determine if the ThrottleEvent state is ThrottleType.Resume or if the state has change to ThrottleType.Pause or ThrottleType.Throttle. If the ThrottleEvent state remains as ThrottleType.Resume, then the script may be configured to output or transmit data to the view data module 190 that includes a parameter indicating the third-party content item was viewed. If the state changes to ThrottleType.Pause or ThrottleType.Throttle then the script does not output the data and awaits another signal indicating the ThrottleEvent state has changed to ThrottleEvent.state=ThrottleType.Resume. In some implementations, the script may be configured to store, in a log, the state changes and a time value, such as a timestamp, with each of the state changes.

In some implementations, the script may be configured to determine whether the content item associated with the script is presented in a cross-domain iframe. If the content item is presented in a cross-domain iframe, the script may be configured to request the code to generate or configure the module from the content item selection system 108, such as via a URL. The content item selection system 108 may retrieve the code and transmit the code to a client device executing the script. A browser of the client device may cache the code, such as a .SWF file, and the script may be configured to configure and inject a module into the content item to execute the .SWF file.

In some implementations, the content item selection module 150 is configured to associate the code to configure the module from the module generation module 160 and/or the script generated by the script generation module 170 with the selected third-party content item. The content item selection system 108 may transmit data to effect display of the selected third-party content item, the code to configure or generate the module (and/or an indication of a position for a module configured using cached code to be located relative to the selected third-party content item), and the generated script to a client device, such as client device 110, via network 106. In some implementations, the script and the third-party content item may be transmitted to the client device first and the code to configure or generate the module may be transmitted after the script determines that the content item is presented in a cross-domain iframe.

Figure 3A:
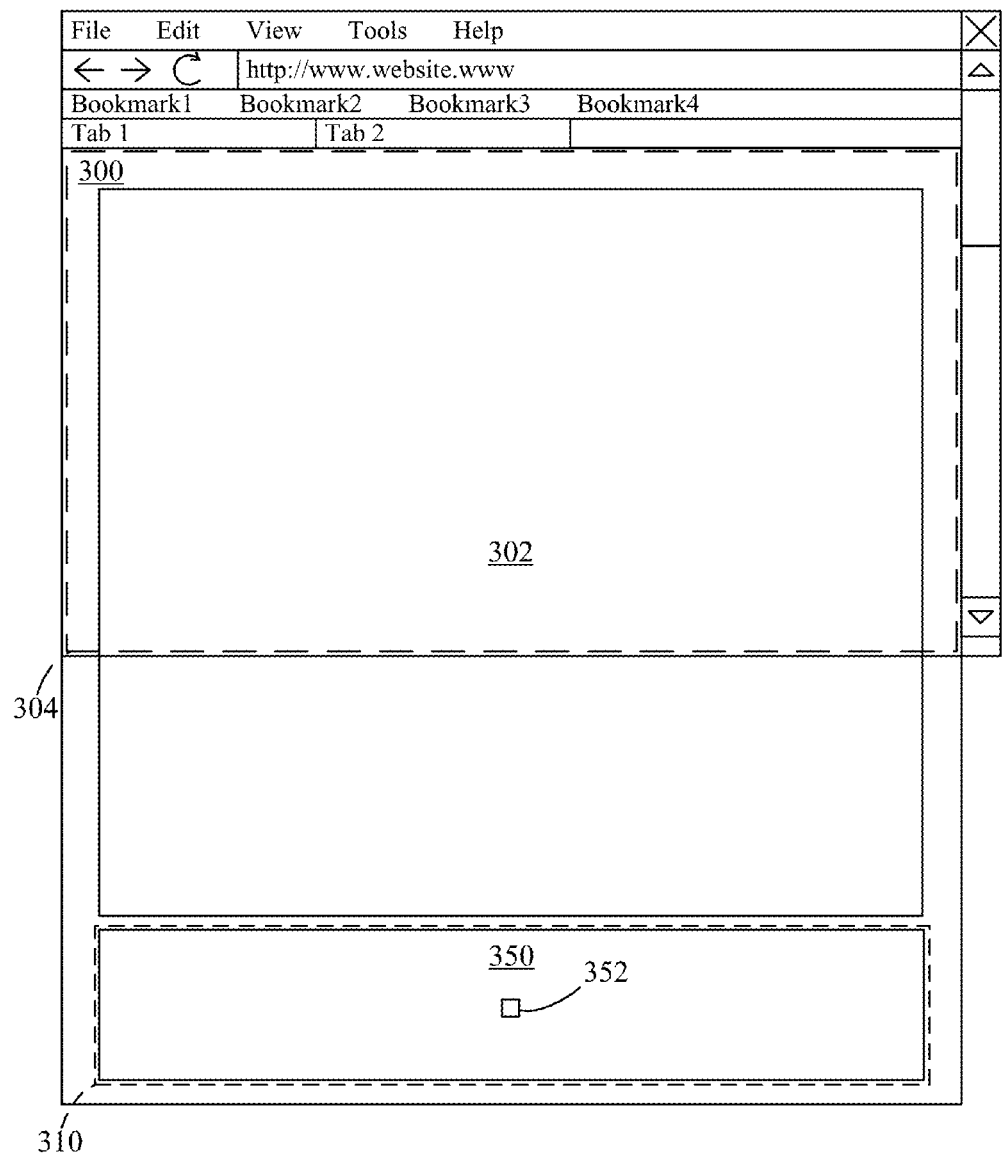
FIG. 3A is an overview depicting an implementation of a resource having a third-party content item associated with a module in a cross-domain iframe shown with the third-party content item located outside of a visible portion of the resource.
Figure 3B:
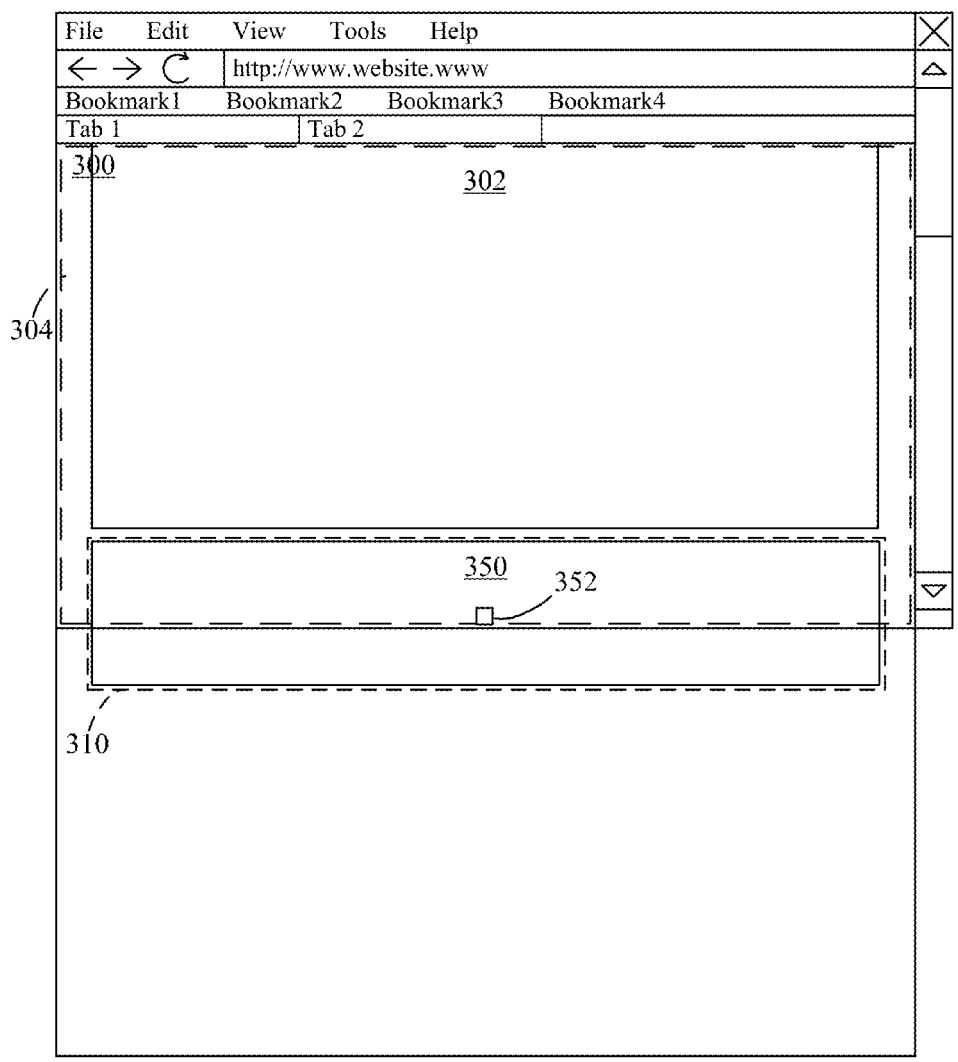
FIG. 3B is an overview depicting the resource of FIG. 3A showing the third-party content item associated with a module in the cross-domain iframe within the visible portion of the resource.

FIGS. 3A-3B depict an implementation of a resource 300 having first party content 302 and a third-party content item 350 associated with a module 352, such as a Flash® module, in a cross-domain iframe 310 (shown in phantom) of the resource 300. In the implementation shown in FIG. 3A, the third-party content item 350 is shown located outside of a visible portion 304 of the resource 300. Thus, the module 352 executes the task a second predetermined number of times per second, such as 2 times per second, when the module 352 is not visible. In some other implementations, the state of the ThrottleEvent may be ThrottleType.Pause or ThrottleType.Throttle while the module 352 is not visible. In some implementations, the third-party content item 350 may be displayed in the cross-domain iframe as part of a div element, such as div id="contentitem" script type="text/javascript"<!--
. . .
//-->
/script
script type="text/javascript"
src="//content item.contentitemserver.com/pagecontentitem/show_contentitem.js"
/script /div In such an implementation, the module 352 may be included with the third-party content item 350 as a child of the div, such as:
div id="contentitem"
. . .
div id="module" module code /div
/div Thus, the module 352 may be associated with the third-party content item such that movement of the third party content item 350 also causes the module 352 to move with the third-party content item 350.

In some implementations, the module 352 may not be included as a child of the div, such as if the third-party content item 350 is a cross-domain iframe itself and/or the third-party content item is a Flash® content item. In such an implementation, the module 352 may be associated with the third-party content item 350 as a sibling of the third-party content item 350 by including the module 352 as a sibling of a parent element of the third part content item 350. For example, the parent element may be a container div having the third-party content item 350 as a child div and the module 352 may also be a child div of the parent element. That is:
div id="parent"
div id="contentiem" . . . /div
div id="module" module code /div
/div In such an implementation, the module 352 may maintain its position relative to the third-party content item 350 by a loop function, such as one included in the script, that measures the position of the third-party content item 350 and modifies the position of the module 352 accordingly. That is, if the third-party content item 350 is first measured at a position of 200 pixels from the top and 100 pixels from the left, then the function may modify the position of the module 352 using such measurements. By way of example, if a single module 352 is used and is to be position in the center of a 300 pixel by 100 pixel third-party content item 350, then the function may modify the position of the module 352 to be located at 250 pixels from the top and 200 pixels from the left. If, in one implementation, the third-party content item 350 is repositioned, such as to 0 pixels from the top and 0 pixels from the left, then the function may modify the position of the module 352 as well, such as to 50 pixels from the top and 150 pixels from the left, to maintain the relative position of the module 352 to the third-party content item 350. Such modification of the position of the module 352 to correspond to the position of the third-party content item 350 may be useful to stop or otherwise limit modules 352 from outputting data indicating that a third-party content item 350 was viewed when the third-party content item 350 is modified, such as by content item blocking programs or otherwise.

If multiple modules 352 are used, then each module's 352 position may be modified accordingly. Examples of such multiple module 352 configurations include four modules 352 located at the edge midpoints of the third-party content item 350, modules 352 arranged in a grid, four modules 352 at the corners of the third-party content item 350, modules 352 at the corners and modules 352 positioned along a hyperbola line representing approximately 50% visibility of the third-party content item; at least two modules 352 along two adjacent edges that "triangulate" the edges of third-party content item 350 with the intersecting visible portion 304 or viewport, etc.

Referring to FIG. 3B, as the resource 300 is scrolled by a user, the third-party content item 350 in the iframe 310 enters into the visible portion 304. When the module 352, which in the present implementation is located substantially at the center of the third-party content item 350, enters the visible portion 304, then the module 352 begins to execute the task a first predetermined number of times per second, such as 24 times per second. Thus, when the script measures the number of times the task executed by the module 352 has been performed just prior to when the module 352 entered the visible portion 304 and compares the number of times the task executed by the module 352 has been performed just after the module 352 entered the visible portion 304, the difference may increase above a threshold value, thereby causing the script to output data indicating that the third-party content item 350 has been viewed.

In some instances, such as due to the rate at which the function of the script polls the number of times the task executed by the module 352 has been performed, the difference between a first determined number of times and a subsequent number of times may be a value between the first predetermined number of times per second and the second predetermined number of times per second, such as 10. Such an intermediate value may occur if the user of the client device 110 on which the third-party content item 350 is presented scrolls the module 352 into the visible portion 304 in between polls of the module 352 by the script. That is, the module 352 may be executing the task at 2 times per second during the first poll and prior to the second poll, the module 352 begins executing the task at 24 times per second, but a full second has not elapsed. Accordingly, the intermediate value may be used to indicate the time prior to the second poll by the function of the script that the module 352 (and thus 50% of the third-party content item 350) came into view. In some implementations, the threshold value may be set to a value that is in between the first predetermined number of times per second and the second predetermined number of times per second to capture such situations.

In some instances, detecting of the scrolling of the module 352 into the visible portion 304 may lag such that the module 352 does not transition to the first predetermined number of times per second from the second predetermined number of times per second for executing the task. For example, for a Flash® module 352, the module may not poll for the on-screen state in between execution of tasks. Accordingly, if the off-screen rate is slow, it may require additional time (e.g., up to 0.5 seconds if at 2 times per second) for the module 352 to determine that the module 352 is in the visible area 304 and to remove any throttles.

In some implementations, if the number of times the task executed by the module 352 has been performed are logged, such as in the cache, then the values may be summed, including the intermediate value, to determine the total time that the third-party content item 350 was visible within the visible portion 304. That is, if an initial intermediate value is 12 and subsequent differences in values of the number of times the task executed by the module include 24, 24, and 12, and the first predetermined number of times per second is 24 times per second, then the view data module 190 that receives the logged values may determine that the third-party content item 350 was visible for approximately 3 seconds.

In other implementations, the module 352 may simply switch the state of the ThrottleEvent to ThrottleType.Resume when the module 352 is visible. The script may receive a signal that the state of the ThrottleEvent has switched to ThrottleType.Resume. In one implementation, the script may output data to the view data module 190 indicating the view in response to the signal. In another implementation, the script may wait one second and check the state of the ThrottleEvent. If the state of the ThrottleEvent remains as ThrottleType.Resume after the one second delay, then the script may output data to the view data module 190 indicating the view. If the state of the ThrottleEvent changes to ThrottleType.Pause or ThrottleType.Throttle after the one second delay, then the script does not output the data and awaits another signal indicating the ThrottleEvent state has changed to ThrottleEvent.state=ThrottleType.Resume.

FIGS. 4-7 depict implementations of processes that may be executed by the content item selection system 108 (e.g., process 400) or the client device 110 (e.g., processes 500, 600, 700).

Figure 4:
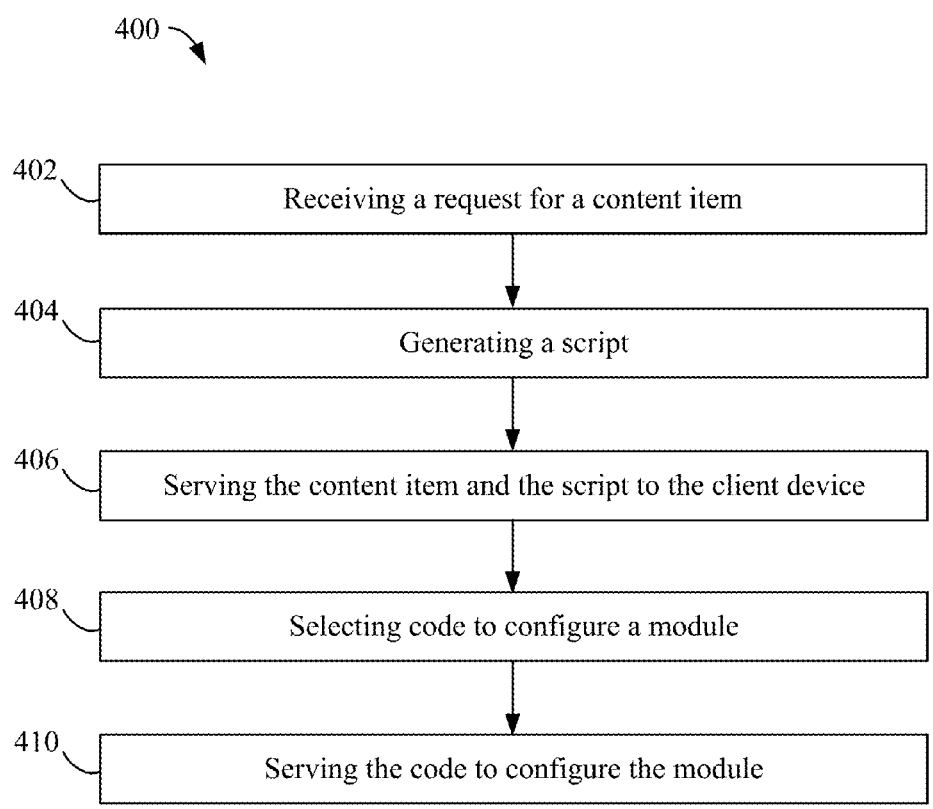
FIG. 4 is a flow diagram of an implementation of a process for detecting the visibility of a third-party content item presented in a cross-domain iframe using tasks triggered by a timer of a module.

Referring to FIG. 4, a process 400 may include receiving a request for a content item (block 402). A content item request that a content item selection system 108 may receive can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, whether the client device has cached code to configure or generate a Flash® module, whether the client device has Flash® installed, the version of Flash® installed, etc.) and resource information (e.g., URL of the requested resource, one or more keywords of the content of the requested resource, text of the content of the resource, a title of the resource, a category of the resource, a type of the resource, whether the third-party content item will be displayed in a cross-domain iframe, etc.). The information that the content item selection system 108 receives can include a HyperText Transfer Protocol (HTTP) cookie which contains a device identifier (e.g., a random number) that represents the client device 110. In some implementations, the device information and/or the resource information may be appended to a content item request URL (e.g., //contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 108 to select third-party content items to be served with the requested resource and presented on a display of a client device 110.

The process 400 further includes generating a script (block 404). The generated script may be configured to determine whether the content item is presented in a cross-domain iframe when the script is executed by a client device, such as client device 110 of FIG. 1. If the script, when executed by the client device, indicates that the content item is to be presented in a cross-domain iframe, the script may be further configured to request a module binary, such as a .SWF file, to configure or generate a Flash® module to be injected into the content item. The request for the module binary code may include a reference, such as a URL, to a location of the module binary. In some implementations, the reference may be a URL to the content item selection system such that the module binary is retrieved from the content item selection system. When the client device receives the module binary, a browser of the client device may cache the module binary, such as a .SWF file.

The script may be further configured to associate a module, such as a Flash® module, with a served content item. The association of the module with the served content item may include injecting a Flash® module into the content item and using a Flash® binary, such as a .SWF code file, to be executed by the Flash® module. In some implementations the Flash® module may be an invisible pixel-sized Flash® module. In some implementations, the associating of the Flash® module with the content item may include associating the Flash® module with a pixel of the content item. The pixel of the content item may be positioned substantially in the center of the content item. The Flash® binary may configure the module to execute a task a first predetermined number of times per second when the module is visible on a display of a client device and a second predetermined number of times per second when the module is not visible on the display of the client device. The first predetermined number of times may be 24 times per second and the second predetermined number of times may be 2 times per second.

The script may be further configured to retrieve a number of times the task executed by the module has been performed and to compare the retrieved number of times the task executed by the module has been performed to a value. The number of times a task has been executed by the module may be determined by retrieving a value for the current count of the timer, such as by using currentCount( ). The script may be configured to periodically poll the Flash® module for the current count approximately every one second. Utilizing the known first predetermined number of times and the second predetermined number of times, the script may compare the current count to a value to determine whether the module is visible on a display of the client device. For example, the value may be an intermediate value, such as 10. In other implementations, the value may be the same as the first predetermined number of times, such as 24. If retrieved number of times the task has been executed by the module exceeds or, in some implementations, equals the value, then the script may be configured to output data to a content item selection system, such as a view data module 190 of the content item selection system 108 of FIG. 2. In some implementations, the script may be further configured to determine a third number of times the task executed by the module has been performed. The script may be further configured to compare the second number of times to the third number of times. The script may also be configured to output data including a parameter if the comparison of the second number of times to the third number of times results in a difference that is greater than the predetermined value.

In some implementations, the script may be further configured to store, in a cache of the client device, the number of times the task executed by the module has been performed. In some implementations, the script is configured to output the data to the view data module including the parameter at an end of a page session. In other implementations, the script may be configured to output the data once the difference is greater than the predetermined value. In some implementations, the module is configured to end the execution of the task if the number of times the task executed by the module has been performed is greater than the value. In some implementations, the script is configured to periodically retrieve the number of times the task executed by the module has been performed and compare the retrieved number of times the task executed by the module has been performed to the value. The outputted data may include a parameter indicating the content item was viewed if the number of times the task executed by the module has been performed is greater than the value. In some implementations, the parameter included with the outputted data may indicate that the content item was not viewed if the number of times is not greater than the value and a page session ends. In some further implementations, the script may be further configured to set a z-index position of the module as a last element in a stack order.

The process 400 further includes serving the content item and the script to the client device (block 406). Serving the content item and the script to the client device may include transmitting data to effect presentation of the content item by the content item selection system, such as content item selection system 108 of FIG. 1, to a client device and/or a resource server via a network. The data for the content item may include graphical data, textual data, image data, audio data, video data, etc. that may be accessed from a database or other data store. The serving of the script may include transmitting a file, such as a JavaScript® script, to the client device. In some implementations, the script may be included in the content item. In other implementations, the script may simply be referred to by the content item, such as a URL for the script. In still further implementations, the Flash® module may be referenced by the content item by a URL or it may be referenced in the script by a URL.

The process 400 includes selecting code to configure a module (block 408). The selected code may include a module binary, such as a .SWF file, to configure or generate a Flash® module to be injected into the content item. The selection of the code to configure the module may be performed in response to a request, such as a URL, referring to a location of the module binary. In some implementations, the reference may be a URL to the content item selection system such that the module binary is retrieved from the content item selection system. The process 400 may further include serving the code to configure the module to the client device (block 410). Serving the code to the client device may include transmitting data for the code by the content item selection system, such as content item selection system 108 of FIG. 1, to a client device and/or a resource server via a network.

In other implementations, such as when the module binary is cached on the client device, the client device may simply retrieve the cached module binary instead of having the content item selection system select and serve the code.

In some implementations, multiple modules may be injected into the content item. For example, the script may be configured to associate a second module with the content item. The second module may be configured to execute the task the first predetermined number of times per second when the second module is visible on the display of the client device and execute the task the second predetermined number of times per second when the second module is not visible on the display of the client device. The second module may be an invisible pixel-sized module associated with a second pixel of the content item positioned substantially at a first corner of the content item. In further implementations, a third module may be used. The script may be configured to associate the third module with the content item. The third module may be configured to execute the task the first predetermined number of times per second when the third module is visible on the display of the client device and execute the task the second predetermined number of times per second when the third module is not visible on the display of the client device. The third module may be an invisible pixel-sized module associated with a third pixel of the content item positioned substantially at a second corner of the content item. In some implementations the first corner and second corner may be opposing corners of the content item. Thus, three pixel-sized modules may be used to determine whether certain pixels of the content item are visible. In other implementations, the first module, the second module, and the third module may be associated with other pixels of the content item, including pixels within the interior of the content item and/or pixels along portions of edges of the content item other than the corners. In some implementations, the task may be an animation of frames while in others the task may not be an animation of frames.

Figure 5:
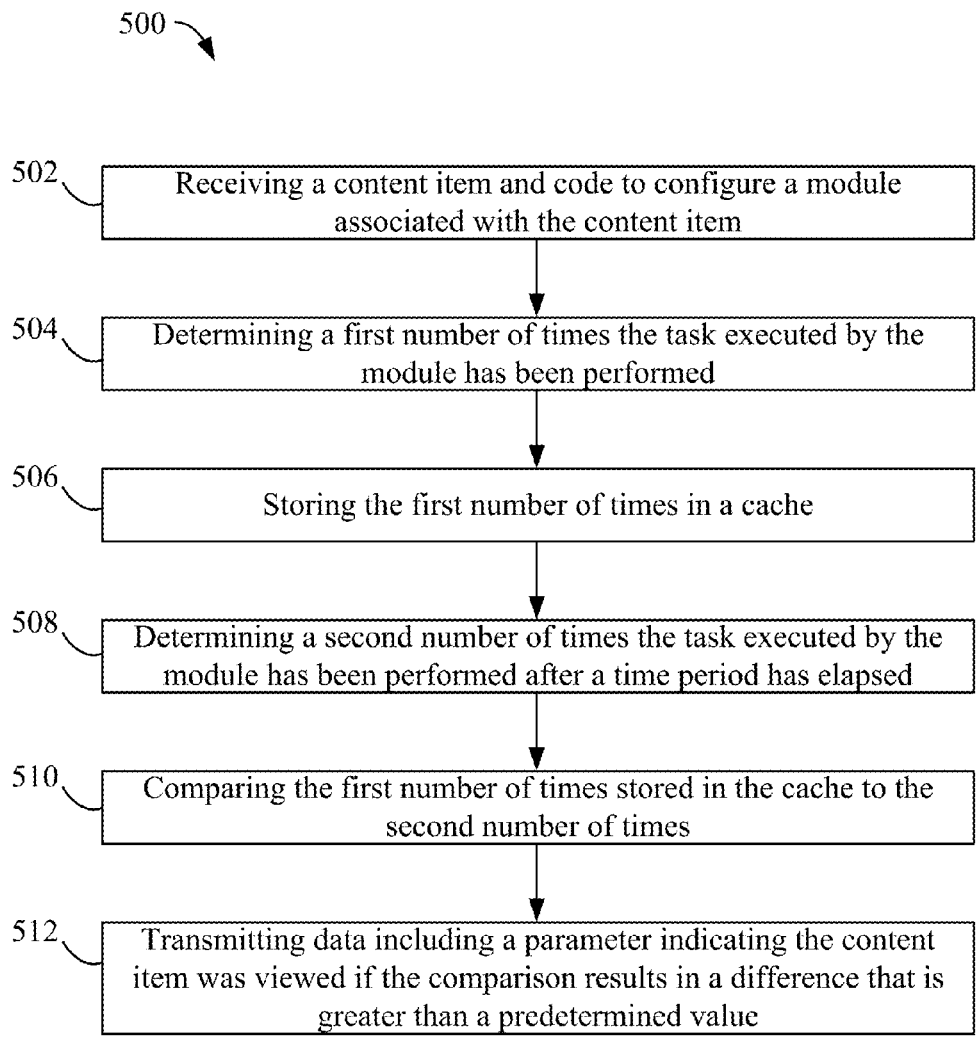
FIG. 5 is a flow diagram of another implementation of a process for detecting the visibility of a third-party content item presented in a cross-domain iframe using tasks triggered by a timer of a module.

Referring to FIG. 5, a process 500 may include receiving a content item and code to configure a module associated with the content item (block 502). Receiving the content item and the code to configured a module associated with the content item may include receiving data to effect presentation of the content item from the content item selection system, such as content item selection system 108 of FIG. 1, by the client device. The data for the content item may include graphical data, textual data, image data, audio data, video data, etc. that may be accessed from a database or other data store.

The code may include a module binary, such as a .SWF file, to configure or generate a Flash® module to be injected into the content item. The code to configure the module may be received in response to a request, such as a URL, referring to a location of the module binary. In some implementations, the reference may be a URL to the content item selection system such that the module binary is retrieved from the content item selection system. In other implementations, such as when the module binary is cached on the client device, the client device may simply retrieve the cached module binary instead of receiving the code from the content item selection system. In some implementations, a script may be received that associates a module, such as a Flash® module, with the received content item. The association of the module with the received content item may include injecting a Flash® module into the content item and using the received code, such as a Flash® binary (e.g., a .SWF code file), to be executed by the Flash® module. In some implementations the Flash® module may be an invisible pixel-sized Flash® module. In some implementations, the associating of the Flash® module with the content item may include associating the Flash® module with a pixel of the content item. The pixel of the content item may be positioned substantially in the center of the content item.

The Flash® binary may configure the module to execute a task a first predetermined number of times per second when the module is visible on a display of a client device and a second predetermined number of times per second when the module is not visible on the display of the client device. The first predetermined number of times may be 24 times per second and the second predetermined number of times may be 2 times per second.

The process 500 further includes determining a first number of times the task executed by the module has been performed (block 504). The first number of times a task has been executed by the module may be determined by retrieving a value for the current count of the timer, such as by using currentCount( ). In some implementations, a script may be configured to poll the Flash® module for the current count approximately every one second. In other implementations, the module itself may determine the number of times the task has been executed by the module.

The first number of times may be stored in a cache (block 506). In some implementations, the number of times may simply be stored as a value in a data structure stored in a storage device of the client device. For example, the first number of times the task has been executed by the module may be stored as a numerical value for a variable.

A second number of times the task executed by the module has been performed may be determined after a time period has elapsed (block 508). The time period may be, for example, one second. The second number of times a task has been executed by the module may be determined by retrieving a value for the current count of the timer, such as by using currentCount( ), after the time period has elapsed. In some implementations, a script may be configured to poll the Flash® module for the current count approximately every one second. In other implementations, the module itself may determine the number of times the task has been executed by the module.

The first number of times stored in the cache may be compared to the second number of times (block 510). In some implementations, if the difference between the second number of times and the first number of times exceeds a threshold or predetermined value, then data may be transmitted that includes a parameter indicating that the content item was viewed (block 512). For example, the threshold or predetermined value may be an intermediate value, e.g., one between the first predetermined number of times and the second predetermined number of times, such as 10. In other implementations, the value may be the same as a first predetermined number of times, such as 24. If retrieved number of times the task has been executed by the module exceeds or, in some implementations, equals the value, the data including the parameter may be outputted to a content item selection system, such as a view data module 190 of the content item selection system 108 of FIG. 2. In some implementations, the module is configured to end the execution of the task if the number of times the task executed by the module has been performed is greater than the value. In other implementations, module and/or a script may be configured to periodically retrieve the number of times the task has been executed by the module has been performed and compare the retrieved number of times the task executed by the module has been performed to the value. The outputted data may include a parameter indicating the content item was viewed if the number of times the task executed by the module has been performed is greater than the value. In some implementations, the parameter included with the outputted data may indicate that the content item was not viewed if the number of times is not greater than the value and a page session ends.

In some implementations, the process 500 may loop back to block 504 from block 510 and repeat until the page session ends without the content item being viewed or data is transmitted indicating that the content item was viewed.

In still further implementations, transmitting the data including a parameter indicating that the content item was viewed may be transmitted only if the number of times the task executed by the module remains above the threshold or predetermined value for multiple iterations. That is, if the first difference value is greater than the threshold or predetermined value, then a counter may be incremented to a value, such as 1. The second number of times the task executed by the module has been performed may be stored in the cache. In some implementations, the storing of the second number of times in the cache may overwrite the first number of times, thereby reducing the size of the cache. In other implementations, the second number of times may be appended to or otherwise stored in the cache such that the first number of times remains in the cache. Thus, a log is generated using the number of times. In some implementations, the first number of times may be associated with a first time value (e.g., a timestamp) and the second number of times may be associated with a second time value.

In some implementations, a third number of times the task executed by the module has been performed may be determined after another time period has elapsed, such as after another second has elapsed. The third number of times may be compared to the second number of times to determine a second difference value. If the second difference value is greater than the threshold value and the counter has a value of 1, then data may be transmitted that includes a parameter indicating that the content item was viewed (block 512).

If the second difference value is not greater than the threshold value, then the counter resets to 0 and the module and/or a script may continue to poll the number of times the task has been executed by the module has been performed. In some implementations, the third number of times the task executed by the module has been performed may also be stored in the cache in a similar manner to the second number of times described above. In some implementations, the counter may be omitted and a sub-function may be used to check that the second difference is also greater than the threshold value.

Figure 6:
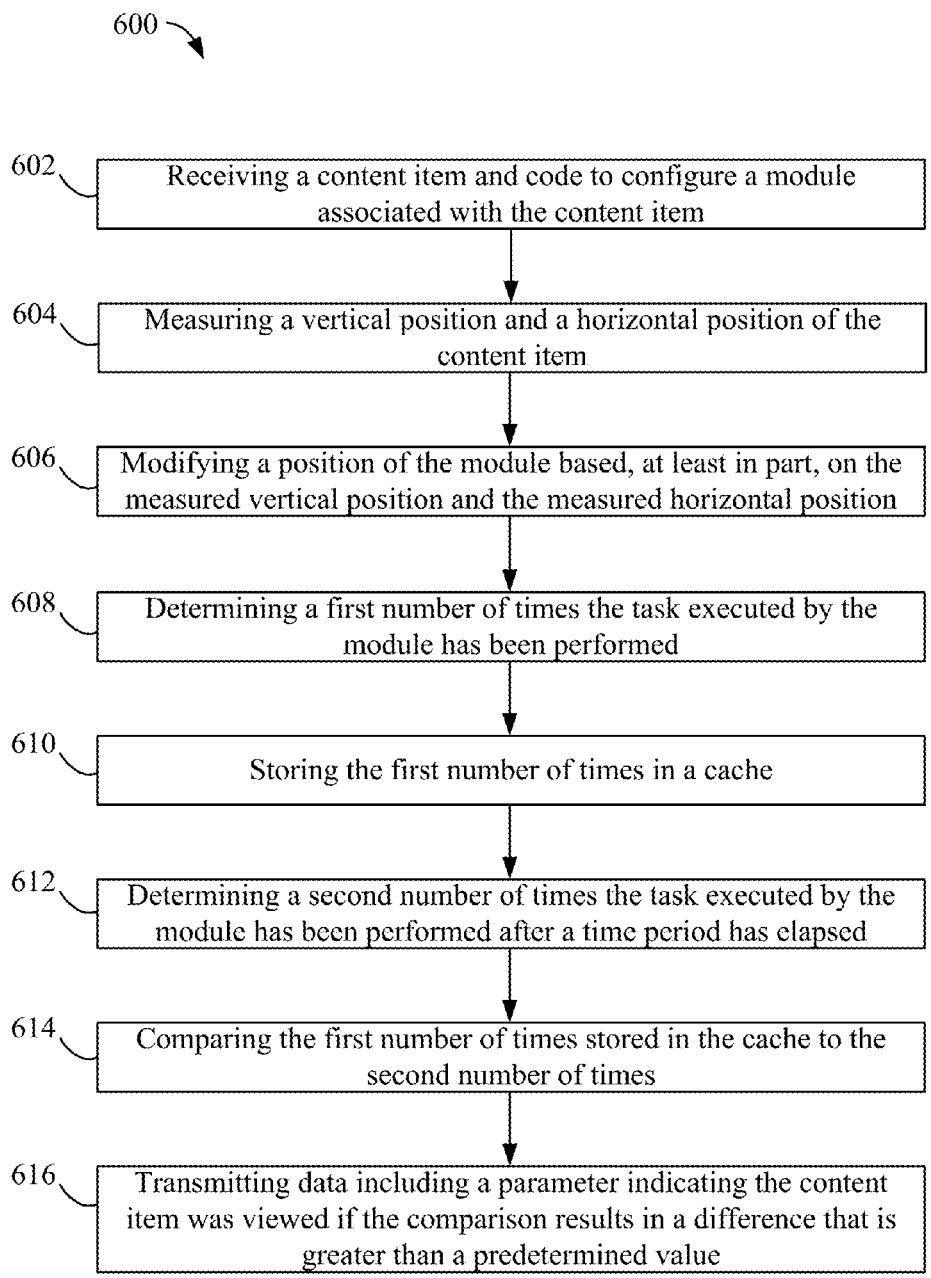
FIG. 6 is a flow diagram of yet another implementation of a process for detecting the visibility of a third-party content item presented in a cross-domain iframe using tasks triggered by a timer of a module.

Referring to FIG. 6, a process 600 may include receiving a content item and code to configure a module associated with the content item (block 602). Receiving the content item and the code to configured a module associated with the content item may include receiving data to effect presentation of the content item from the content item selection system, such as content item selection system 108 of FIG. 1, by the client device. The data for the content item may include graphical data, textual data, image data, audio data, video data, etc. that may be accessed from a database or other data store.

The code may include a module binary, such as a .SWF file, to configure or generate a Flash® module to be injected into the content item. The code to configure the module may be received in response to a request, such as a URL, referring to a location of the module binary. In some implementations, the reference may be a URL to the content item selection system such that the module binary is retrieved from the content item selection system. In other implementations, such as when the module binary is cached on the client device, the client device may simply retrieve the cached module binary instead of receiving the code from the content item selection system. In some implementations, a script may be received that associates a module, such as a Flash® module, with the received content item. The association of the module with the received content item may include injecting a Flash® module into the content item and using the received code, such as a Flash® binary (e.g., a .SWF code file), to be executed by the Flash® module. In some implementations the Flash® module may be an invisible pixel-sized Flash® module. In some implementations, the associating of the Flash® module with the content item may include associating the Flash® module with a pixel of the content item. The pixel of the content item may be positioned substantially in the center of the content item.

The Flash® binary may configure the module to execute a task a first predetermined number of times per second when the module is visible on a display of a client device and a second predetermined number of times per second when the module is not visible on the display of the client device. The first predetermined number of times may be 24 times per second and the second predetermined number of times may be 2 times per second.

The process 600 may include measuring a vertical position and a horizontal position of the content item (block 604). For example, the vertical position and horizontal position may be determined based on a number of pixels the content item is relative to the upper border and left border of the iframe in which the content item is displayed. That is, a numerical value for the vertical position and the horizontal position may be determined for the displayed content item. I some implementations, the script may be configured to measure the vertical position and the horizontal position of the content item periodically (e.g., every 0.5 seconds, every 1 second, every 2 seconds, every 5 seconds, every 10 seconds, every 30 seconds, every minute, etc.).

A position of the module may be modified based, at least in part, on the measured vertical position and the measured horizontal position (block 606). The module may be moved to keep the module aligned with a pixel of a content item based on the measured vertical and horizontal position of the content item in the iframe. In some implementations, the script may be configured to modify the position of the module based on the measured vertical and horizontal position of the content item. In some implementations, the script may compare a first measured vertical and horizontal position to a second measured vertical and horizontal position to determine if a position of the content item has been changed. If, for example, the content item is moved after loading in the iframe, the script may be configured to move the module with the content item. Thus, if a first part content provider or other entity attempts to relocate the content item within the iframe, but still tries to keep the module within the iframe (e.g., to hide an advertisement while attempting to have an impression count when the advertisement is hidden) then the script modifies the position of the module to maintain the module's position relative to the content item.

The process 600 further includes determining a first number of times the task executed by the module has been performed (block 608) The first number of times a task has been executed by the module may be determined by retrieving a value for the current count of the timer, such as by using currentCount( ). In some implementations, a script may be configured to poll the Flash® module for the current count approximately every one second. In other implementations, the module itself may determine the number of times the task has been executed by the module.

The first number of times may be stored in a cache (block 610). In some implementations, the number of times may simply be stored as a value in a data structure stored in a storage device of the client device. For example, the first number of times the task has been executed by the module may be stored as a numerical value for a variable.

A second number of times the task executed by the module has been performed may be determined after a time period has elapsed (block 612). The time period may be, for example, one second. The second number of times a task has been executed by the module may be determined by retrieving a value for the current count of the timer, such as by using currentCount( ), after the time period has elapsed. In some implementations, a script may be configured to poll the Flash® module for the current count approximately every one second. In other implementations, the module itself may determine the number of times the task has been executed by the module.

The first number of times stored in the cache may be compared to the second number of times (block 614). In some implementations, if the difference between the second number of times and the first number of times exceeds a threshold or predetermined value, then data may be transmitted that includes a parameter indicating that the content item was viewed (block 616). For example, the threshold or predetermined value may be an intermediate value, e.g., one between the first predetermined number of times and the second predetermined number of times, such as 10. In other implementations, the value may be the same as a first predetermined number of times, such as 24. If retrieved number of times the task has been executed by the module exceeds or, in some implementations, equals the value, the data including the parameter may be outputted to a content item selection system, such as a view data module 190 of the content item selection system 108 of FIG. 2. In some implementations, the module is configured to end the execution of the task if the number of times the task executed by the module has been performed is greater than the value. In other implementations, module and/or a script may be configured to periodically retrieve the number of times the task executed by the module has been performed and compare the retrieved number of times the task executed by the module has been performed to the value. The outputted data may include a parameter indicating the content item was viewed if the number of times the task executed by the module has been performed is greater than the value. In some implementations, the parameter included with the outputted data may indicate that the content item was not viewed if the number of times is not greater than the value and a page session ends.

In some implementations, the process 600 may loop back to block 604 from block 614 and repeat until the page session ends without the content item being viewed or data is transmitted indicating that the content item was viewed.

In still further implementations, transmitting the data including a parameter indicating that the content item was viewed may be transmitted only if the number of times the task executed by the module remains above the threshold or predetermined value for multiple iterations. That is, if the first difference value is greater than the threshold or predetermined value, then a counter may be incremented to a value, such as 1. The second number of times the task executed by the module has been performed may be stored in the cache. In some implementations, the storing of the second number of times in the cache may overwrite the first number of times, thereby reducing the size of the cache. In other implementations, the second number of times may be appended to or otherwise stored in the cache such that the first number of times remains in the cache. Thus, a log is generated using the number of times. In some implementations, the first number of times may be associated with a first time value (e.g., a timestamp) and the second number of times may be associated with a second time value.

In some implementations, a third number of times the task executed by the module has been performed may be determined after another time period has elapsed, such as after another second has elapsed. The third number of times may be compared to the second number of times to determine a second difference value. If the second difference value is greater than the threshold value and the counter has a value of 1, then data may be transmitted that includes a parameter indicating that the content item was viewed (block 616).

If the second difference value is not greater than the threshold value, then the counter resets to 0 and the module and/or a script may continue to poll the number of times the task has been executed by the module has been performed. In some implementations, the third number of times the task executed by the module has been performed may also be stored in the cache in a similar manner to the second number of times described above. In some implementations, the counter may be omitted and a sub-function may be used to check that the second difference is also greater than the threshold value.

Figure 7:
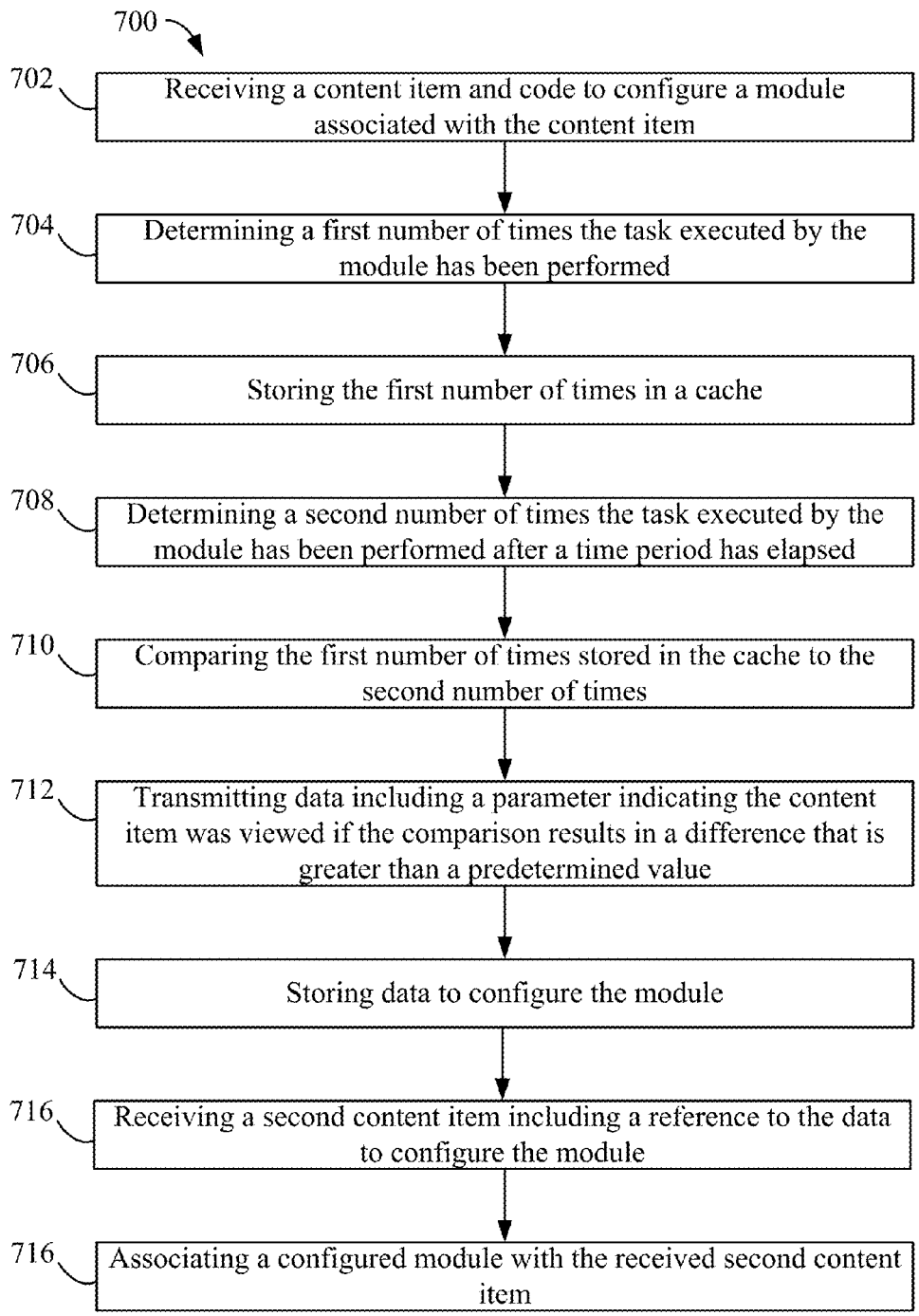
FIG. 7 is a flow diagram of still yet another implementation of a process for detecting the visibility of a third-party content item presented in a cross-domain iframe using tasks triggered by a timer of a module.

Referring to FIG. 7, a process 700 may include receiving a content item and code to configure a module associated with the content item (block 702). Receiving the content item and the code to configured a module associated with the content item may include receiving data to effect presentation of the content item from the content item selection system, such as content item selection system 108 of FIG. 1, by the client device. The data for the content item may include graphical data, textual data, image data, audio data, video data, etc. that may be accessed from a database or other data store.

The code may include a module binary, such as a .SWF file, to configure or generate a Flash® module to be injected into the content item. The code to configure the module may be received in response to a request, such as a URL, referring to a location of the module binary. In some implementations, the reference may be a URL to the content item selection system such that the module binary is retrieved from the content item selection system. In other implementations, such as when the module binary is cached on the client device, the client device may simply retrieve the cached module binary instead of receiving the code from the content item selection system. In some implementations, a script may be received that associates a module, such as a Flash® module, with the received content item. The association of the module with the received content item may include injecting a Flash® module into the content item and using the received code, such as a Flash® binary (e.g., a .SWF code file), to be executed by the Flash® module. In some implementations the Flash® module may be an invisible pixel-sized Flash® module. In some implementations, the associating of the Flash® module with the content item may include associating the Flash® module with a pixel of the content item. The pixel of the content item may be positioned substantially in the center of the content item.

The Flash® binary may configure the module to execute a task a first predetermined number of times per second when the module is visible on a display of a client device and a second predetermined number of times per second when the module is not visible on the display of the client device. The first predetermined number of times may be 24 times per second and the second predetermined number of times may be 2 times per second.

The process 700 further includes determining a first number of times the task executed by the module has been performed (block 704). The first number of times a task has been executed by the module may be determined by retrieving a value for the current count of the timer, such as by using currentCount( ). In some implementations, a script may be configured to poll the Flash® module for the current count approximately every one second. In other implementations, the module itself may determine the number of times the task has been executed by the module.

The first number of times may be stored in a cache (block 706). In some implementations, the number of times may simply be stored as a value in a data structure stored in a storage device of the client device. For example, the first number of times the task has been executed by the module may be stored as a numerical value for a variable.

A second number of times the task executed by the module has been performed may be determined after a time period has elapsed (block 708). The time period may be, for example, one second. The second number of times a task has been executed by the module may be determined by retrieving a value for the current count of the timer, such as by using currentCount( ), after the time period has elapsed. In some implementations, a script may be configured to poll the Flash® module for the current count approximately every one second. In other implementations, the module itself may determine the number of times the task has been executed by the module.

The first number of times stored in the cache may be compared to the second number of times (block 710). In some implementations, if the difference between the second number of times and the first number of times exceeds a threshold or predetermined value, then data may be transmitted that includes a parameter indicating that the content item was viewed (block 712). For example, the threshold or predetermined value may be an intermediate value, e.g., one between the first predetermined number of times and the second predetermined number of times, such as 10. In other implementations, the value may be the same as a first predetermined number of times, such as 24. If retrieved number of times the task has been executed by the module exceeds or, in some implementations, equals the value, the data including the parameter may be outputted to a content item selection system, such as a view data module 190 of the content item selection system 108 of FIG. 2. In some implementations, the module is configured to end the execution of the task if the number of times the task executed by the module has been performed is greater than the value. In other implementations, module and/or a script may be configured to periodically retrieve the number of times the task executed by the module has been performed and compare the retrieved number of times the task executed by the module has been performed to the value. The outputted data may include a parameter indicating the content item was viewed if the number of times the task executed by the module has been performed is greater than the value. In some implementations, the parameter included with the outputted data may indicate that the content item was not viewed if the number of times is not greater than the value and a page session ends.

In some implementations, the process 700 may loop back to block 704 from block 710 and repeat until the page session ends without the content item being viewed or data is transmitted indicating that the content item was viewed.

The process 700 further includes storing data to configure the module (block 714). In some implementations, the data to configure the module may be stored in a storage device of the client device. The data to configure the module may include the Flash® binary (e.g., a .SWF code file).

The process 700 may also include receiving a second content item including a reference to the data to configure the module (block 716). Receiving the content item including a reference to the data to configure the module may include receiving data to effect presentation of the content item from the content item selection system, such as content item selection system 108 of FIG. 1, by the client device. The data for the content item may include graphical data, textual data, image data, audio data, video data, etc. that may be accessed from a database or other data store. The code to configure the module may be received in response to a request, such as a URL, referring to a location of the module binary. In some implementations, the reference may be a URL to the module binary such that the client device retrieves the cached module binary instead of receiving the code from the content item selection system. In some implementations, a script may be received with the second content item. The script may be configured to associate a module, such as a Flash® module, with the received second content item.

The process 700 further includes associating a configured module with the received second content item (block 716). The association of the module with the received content item may include injecting a Flash® module into the content item and using the cached code, such as the Flash® binary (e.g., a .SWF code file), to be executed by the Flash® module. In some implementations the Flash® module may be an invisible pixel-sized Flash® module. In some implementations, the associating of the Flash® module with the content item may include associating the Flash® module with a pixel of the content item. The pixel of the content item may be positioned substantially in the center of the content item.

In some implementations, failure modes may be included. For example, the polling of the module by the script may fail (e.g., not return a value) until the web browser loads the module and begins execution of the module. If, in some implementations, the polling of the module does not return a value after a predetermined period of time, such as 3 seconds, then the script may output or transmit data to the view data module 190 that includes a parameter indicating that the third-party content item was "unmeasurable." For example, such a situation may arise if the web browser blocks execution of the module, such as a web browser that block Flash®, or does not support execution of the module, such as a device or web browser that does not have Flash® support. In some implementations, if the function of the script determines that the difference between the number of times the task executed by the module has been performed is zero over a few seconds, such as 3 seconds, then the script may be configured to output or transmit data to the view data module 190 that includes a parameter indicating that the third-party content item was "unmeasurable." For example, the module may be frozen.

In some implementations, a JavaScript® script executed by a web browser of a client device may determine that a third-party content item is to be displayed as part of a cross-domain iframe and may transmit data indicative of this determination to a content item selection system, such as a parameter in a content item request. In some implementations, once the determination is made that the third-party content item is to be displayed as part of the cross-domain iframe, then the script may create the module, such as a pixel-sized Flash® module, which causes the web browser to asynchronously request the module, such as a pixel-sized Flash® module binary (e.g., a .SWF file) from a content server, such as the content item selection system or another system. The script may place the module into the cross-domain iframe and then may begin to poll the module at the rate, such as once per second.

Figure 8:
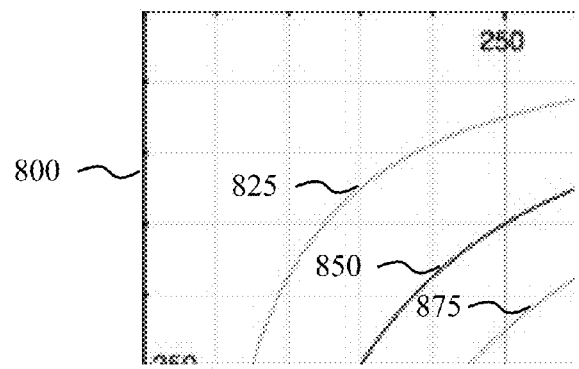
FIG. 8 is a graphical diagram depicting an region representative of a content item and several hyperbolic lines corresponding to visibility percentages of 25%, 50%, and 75%.

FIG. 8 depicts a 300 pixel by 250 pixel region 800 showing hyperbolic curves 825, 850, 875 representing 25% viewability, 50% viewability, and 75% viewability, respectively. That is, if the top-left corner of the region 800 is within the visible area 304 or viewport and the hyperbolic curve 825 is at all visible within the visible area 304 or viewport, then the third-party content item, represented by the region 800, is at least 25% visible. Similarly, if the top-left corner of the region 800 is within the visible area 304 or viewport and the hyperbolic curve 850 is at all visible within the visible area 304 or viewport, then the third-party content item, represented by the region 800, is at least 50% visible. If the top-left corner of the region 800 is within the visible area 304 or viewport and the hyperbolic curve 875 is at all visible within the visible area 304 or viewport, then the third-party content item, represented by the region 800, is at least 75% visible. In some implementations, such hyperbolic curves 825, 850, 875 may be used to determine a position for a module, such as module 352, for a the third-party content item. For example, modules may be positioned at the corners of the third-party content item and modules may also be positioned along hyperbolic curve 850 representing approximately 50% visibility of the third-party content item. In other implementations, modules may be positioned at the top-left corner and along hyperbolic curve 825 representing approximately 25% visibility of the third-party content item, modules may be positioned at the top-left corner and along hyperbolic curve 850 representing approximately 50% visibility of the third-party content item, modules may be positioned at the top-left corner and along hyperbolic curve 875 representing approximately 75% visibility of the third-party content item, modules may be positioned along hyperbolic curve 825 representing approximately 25% visibility of the third-party content item, modules may be positioned along hyperbolic curve 850 representing approximately 50% visibility of the third-party content item, modules may be positioned along hyperbolic curve 875 representing approximately 75% visibility of the third-party content item, modules may be positioned along hyperbolic curves 825, 850 representing approximately 25% visibility and approximately 50% visibility of the third-party content item, modules may be positioned along hyperbolic curves 825, 875 representing approximately 25% visibility and approximately 75% visibility of the third-party content item, modules may be positioned along hyperbolic curves 850, 875 representing approximately 50% visibility and approximately 75% visibility of the third-party content item, modules may be positioned along hyperbolic curves 825, 850, 875 representing approximately 25% visibility, approximately 50% visibility, and approximately 75% visibility of the third-party content item, modules may be positioned randomly along one or more of the hyperbolic curves 825, 850, 875, etc. Still other configurations and uses for hyperbolic curves 825, 850, 875 may be implemented as well. For example, the diagram shown in FIG. 8 may be inverted for situations where the bottom-left corner is visible.

In some instances, the module may not throttle the executing of the task from the first predetermined number of times per second to the second predetermined number of times per second in certain situations. For example, the module may not throttle the execution of the task by a minimization of a browser window or a switching of tab or window focus. In such situations, a JavaScript® script can be configured to receive tab- and/or window-switch events even inside a cross-domain iframe. In such implementations, the script may be utilized to throttle the module and/or to log the time that the tab or window was switched or minimized such that a more accurate measure of the time that the third-party content item was visible may be made.

In still other implementations, such as when a detected web browser is a Mozilla® Firefox® web browser, the modules may not be Adobe® Flash® modules, but may instead be pixel-sized iframes injected into a third-party content item. For example, the content item selection system 108 may receive an indication, such as a parameter in a content item request 202, that indicates the web browser executing on a client device 110 is a Mozilla® Firefox® web browser. The content item selection system 108 may inject one or several pixel-sized iframes into the third-party content item using the module generation module 160. The script generated by the script generation module 170 may include a function to measure a mozPaintCount of each injected pixel-sized iframe. The mozPaintCount counts the number of times a window, such as the pixel-sized iframe is "painted" on a screen. Windows that are visible on-screen may be "painted" approximately 20 times per second. Windows that are off-screen are not painted. Accordingly, the script may be configured to measure the paint count via mozPaintCount for the one or several pixel-sized iframes to determine whether the third-party content item is within a visible area on a display of the client device. For example, the script may be configured to measure the paint count via mozPaintCount every 100 milliseconds. In one implementation, once the paint count exceeds a threshold value, such as 20, then the script may output data to the view data module 190 indicating that the third-party content item was viewed. If the page session ends and the threshold value is not exceeded, then the script may output data to the view data module 190 indicating that the third-party content item was not viewed. In another implementation, the script may include a first threshold value, such as 5, for the paint count that causes the script to initiate a timer, such as a one second timer. If the paint count exceeds a second threshold value, such as 20, then the script may output data to the view data module 190 indicating that the third-party content item was viewed. If the paint count does not exceed the second threshold value, then the script, after the one second timer elapses, may loop back and use the last paint count plus the first threshold value for a new first threshold value and the last paint count plus the second threshold value for a new second threshold value.

In some implementations the Flash® module or other module may store the number of times the task executed by the module has been performed and compare the number of times the task executed by the module has been performed to the value. The Flash® module or other module may communicate to the script only a boolean value indicating whether the module is currently on screen or not. In still other implementations, the module itself may output data to a view data module of the content item selection system that includes a parameter indicating the content item was viewed.

In some implementations, the modules described herein may be used for other purposes. For example, the aforementioned modules may be used for above-the-fold detection. In one implementation, a module may be associated with a bottom-right corner of a third-party content item to detect whether the entirety of the third-party content item is in the visible area upon loading of the resource in an executing web browser of a client device. In another implementation, the modules described herein may be utilized for third-party content item spam detection. In one implementation, the module may be positioned in a top-left corner of a third-party content item to determine if a content item slot of a resource is in a position such that the third-party content item never, or almost never, is viewed. For example, a resource, such as a web page, may include content item slots that are positioned very far from the first party content such that a user would need to scroll through an expansive portion of the web page to view the third-party content item. The use of the module may determine and/or identify such content item slots that never, or almost never, are viewed.

In still another implementation, the aforementioned modules may be placed at various positions on a resource, such as a web page, to produce data indicative of whether the portion of the resource was visible on a client device and, in some implementations, how long the portion was visible. Such data may be utilized to produce a graphical representation of how one or an aggregate group of users of client devices view a resource. In some implementations, the modules may be used to map how one or an aggregate group of users of client devices engage with a resource. For example, the modules may be positioned at several positions on a web page and the script may be used to determine which portions of the web page are visible as a user of a client device navigates the web page. Such data may be used to develop maps of how client devices navigate a web page and/or where client devices dwell in relation to the content of the web page. In some other implementations, the modules described herein may be used for analysis of how traffic flows through several resources. In still other implementations, the modules described herein may be used with an application to provide a signal to the application. For example, on some older web browsers, certain applications with throttling features may not be functional. If such an older web browser is detected, the modules described herein may be included with the application and used to output a signal to the application to throttle the application when the module is not visible. Of course other implementations for the modules and the detection of visibility using tasks triggered by a timer may be determined.

Figure 9:
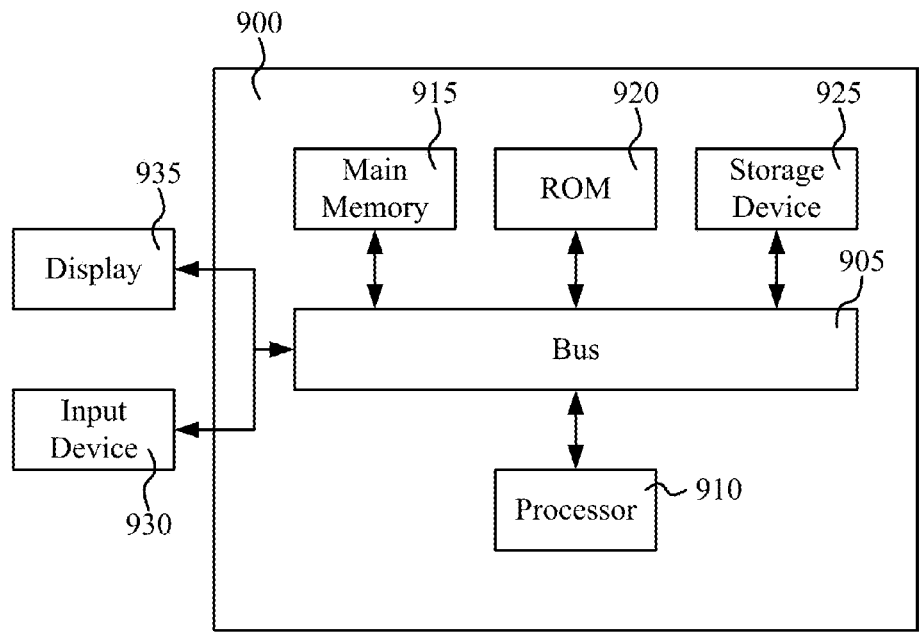
FIG. 9 is a block diagram depicting a general architecture for a computer system that may be employed to implement various elements of the systems and methods described and illustrated herein.

FIG. 9 is a block diagram of a computer system 900 that can be used to implement the client device 110, content item selection system 108, third-party content server 102, resource server 104, etc. The computing system 900 includes a bus 905 or other communication component for communicating information and a processor 910 coupled to the bus 905 for processing information. The computing system 900 can also include one or more processors 910 coupled to the bus for processing information. The computing system 900 also includes main memory 915, such as a RAM or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a ROM 920 or other static storage device coupled to the bus 905 for storing static information and instructions for the processor 910. A storage device 925, such as a solid state device, magnetic disk or optical disk, is coupled to the bus 905 for persistently storing information and instructions.

Computing device 900 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 900 may be coupled via the bus 905 to a display 935, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 930, such as a keyboard including alphanumeric and other keys, may be coupled to the bus 905 for communicating information and command selections to the processor 910. In another implementation, the input device 930 may be integrated with the display 935, such as in a touch screen display. The input device 930 can include a cursor control, such as a mouse, a trackball, or cursor direction keys, for communicating direction information and command selections to the processor 910 and for controlling cursor movement on the display 935.

According to various implementations, the processes and/or methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes and/or method steps described herein. One or more processors in a multi-processing arrangement may also be employed to execute the instructions contained in main memory 915. In alternative implementations, hard-wired circuitry may be used in place of or in combination with software instructions to effect illustrative implementations. Thus, implementations are not limited to any specific combination of hardware circuitry and software.

Although an implementation of a computing system 900 has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the present disclosure. In some cases, the actions recited can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for detecting visibility of a content item comprising:
   receiving, at one or more processors of a content item selection system, a request for a content item;
   generating, using the one or more processors, a script configured to:
      determine that the content item is to be displayed as part of a cross-domain iframe,
      inject a first module at a first position within the content item, the first module executing a task a first predetermined number of times per second when the first module is visible on a display of a client device and a second predetermined number of times per second when the first module is not visible on the display of the client device,
      inject a second module at a second position within the content item, the second module executing the task the first predetermined number of times per second when the second module is visible on a display of a client device and the second predetermined number of times per second when the second module is not visible on the display of the client device,
      determine a first number of times the task executed by the first module has been performed at a first time,
      determine a second number of times the task executed by the first module has been performed at a second time,
      determine a third number of times the task executed by the second module has been performed at the first time,
      determine a fourth number of times the task executed by the second module has been performed at the second time,
      determine a first difference between the first number of times and the second number of times,
      determine a second difference between the third number of times and the fourth number of times, and
      output data to the content item selection system including a parameter indicating at least a threshold amount of the content item was viewed in response to determining both the first difference and the second difference are greater than a predetermined value;
   serving the content item and the script to the client device;
   selecting, using one or more processors, code to configure the module; and
   serving the code to configure the module to the client device.

2. The method of claim 1, wherein the script is further configured to store, in a cache of the client device, the first number of times and the second number of times the task executed by the first module has been performed, and the third number of times and the fourth number of times the task executed by the second module has been performed.

3. The method of claim 1, wherein the script is configured to output the data to a view data module including the parameter at an end of a page session.

4. The method of claim 1, wherein the first module and the second module are invisible pixel-sized modules.

5. The method of claim 4, wherein the script is further configured to associate a third module with a pixel of the content item, wherein the pixel of the content item is positioned substantially in the center of the content item.

6. The method of claim 5, wherein the script is further configured to set a z-index position of the third module as a last element in a stack order.

7. The method of claim 1, wherein each of the first module and the second module is configured to end the execution of the task if the number of times the task executed by the module has been performed is greater than a value.

8. The method of claim 1, wherein the first predetermined number of times per second is 24 and the second predetermined number of times per second is 2.

9. The method of claim 1, wherein the parameter included with the data indicates that at least a threshold amount of the content item was not viewed in response to determining both the first difference and the second difference are not greater than the predetermined value.

10. The method of claim 1, wherein the script is further configured to periodically retrieve the number of times the task executed by each of the first module and the second module has been performed and compare the retrieved number of times the task executed by each of the first module and the second module has been performed to a value.

11. A method for outputting a view parameter for a content item comprising:
receiving, at a client device, a content item and code to configure a plurality of modules injected at a plurality of positions within the content item, wherein each of the modules is configured to execute a task a first predetermined number of times per second when the module is visible on a display of the client device and a second predetermined number of times per second when the module is not visible on the display of the client device;
injecting, using one or more processors of the client device, a first module at a first position within the content item and a second module at a second position within the content item;
determining, using one or more processors of the client device, a first number of times the task executed by the first module has been performed at a first time;
determining, using one or more processors of the client device, a second number of times the task executed by the first module has been performed at a second time,
determining a third number of times the task executed by the second module has been performed at the first time,
determining a fourth number of times the task executed by the second module has been performed at the second time,
storing the first number of times, the second number of times, the third number of times, and the fourth number of times in a cache;
determining, using one or more processors of the client device, a first difference between the first number of times and the second number of times and a second difference between the third number of times and the fourth number of times; and
transmitting data to a content item selection system including a parameter indicating at least a threshold amount of the content item was viewed in response to determining both the first difference and the second difference are greater than a predetermined value, wherein the predetermined value is a numerical value between the first predetermined number of times and the second predetermined number of times.

12. The method of claim 11, wherein the parameter indicates that at least a threshold amount of the content item was not viewed in response to determining both the first difference and the second difference are not greater than the predetermined value.

13. The method of claim 11, wherein the first predetermined number of times per second is 24, and wherein the second predetermined number of times per second is 2.

14. The method of claim 11 further comprising:
measuring, using one or more processors of the client device, a vertical position and a horizontal position of the content item; and
modifying a position of at least one of the plurality of modules based, at least in part, on the measured vertical position and the measured horizontal position.

15. The method of claim 14, wherein the at least one module is a sibling of the content item.

16. The method of claim 11 further comprising:
storing, in a storage device of the client device, data to configure the plurality of modules;
receiving, at the client device, a second content item including a reference to the data to configure the plurality of modules; and
associating, using one or more processors of the client device, a plurality of configured modules with the received second content item.

17. A system comprising:
one or more processors; and
a storage device storing instructions that, when executed by the one or more processors, cause the one or more processors to perform operations comprising:
receiving a request for a content item,
selecting code to configure a first module and a second module, wherein each of the first module and the second module is configured to execute a task a first predetermined number of times per second when the module is visible on a display of a client device and a second predetermined number of times per second when the module is not visible on the display of the client device,
generating a script configured to:
determine that the content item is to be displayed as part of a cross-domain iframe,
associate the first module with the content item, wherein the first module is an invisible pixel-sized module, wherein the first module is associated with a plurality of pixels of the content item positioned along a first hyperbolic curve, wherein the first hyperbolic curve indicates a first amount of the content item is visible;
associate the second module with the content item, wherein the second module is an invisible pixel-sized module, wherein the second module is associated with at least one pixel at a first corner of the content item;
determine a first number of times the task executed by the first module has been performed at a first time,
determine a second number of times the task executed by first module has been performed at a second time,
determine a third number of times the task executed by the second module has been performed at the first time,
determine a fourth number of times the task executed by the second module has been performed at the second time,
determine a first difference between the first number of times and the second number of times and a second difference between the third number of times and the fourth number of times, output data including a parameter, wherein the parameter indicates that the first amount of content item indicated by the first hyperbolic curve was viewed in response to determining both the first difference and the second difference are greater than a predetermined value, wherein the parameter indicates that the first amount of content item was not viewed in response to determining both the first difference and the second difference are not greater than the predetermined value, and serving the content item, the script, and the selected code to the client device in response to the request for a content item.

18. The system of claim 17, wherein script is further configured to:
associate a third module with the content item, wherein the third module is configured to execute the task the first predetermined number of times per second when the third module is visible on the display of the client device, wherein the third module is configured to execute the task the second predetermined number of times per second when the third module is not visible on the display of the client device, wherein the third module is an invisible pixel-sized module, wherein the third module is associated with a third pixel of the content item positioned substantially at a second corner of the content item, wherein the second corner is opposite the first corner.

19. The system of claim 17, wherein the task is not an animation of frames.

20. The system of claim 17, wherein the script is further configured to:
associate a fourth module with the content item, wherein the fourth module is configured to execute the task the first predetermined number of times per second when the fourth module is visible on the display of the client device, wherein the third module is configured to execute the task the second predetermined number of times per second when the fourth module is not visible on the display of the client device, wherein the fourth module is an invisible pixel-sized module, wherein the fourth module is associated a plurality of pixels positioned along a second hyperbolic curve, wherein the second hyperbolic curve indicates a second amount of content item is visible.

* * * * *